US012674985B2

(12) United States Patent
Leu

(10) Patent No.: US 12,674,985 B2
(45) Date of Patent: Jul. 7, 2026

(54) NEAR-EYE DISPLAY DEVICE WITH RELAY OPTICAL PRISM AND OPTICAL COMBINER

(71) Applicant: Jorjin Technologies Inc., New Taipei City (TW)

(72) Inventor: Chun-Wei Leu, New Taipei City (TW)

(73) Assignee: Jorjin Technologies Inc., New Taipei City (TW)

( * ) Notice: Subject to any disclaimer, the term of this patent is extended or adjusted under 35 U.S.C. 154(b) by 0 days.

(21) Appl. No.: 18/581,354

(22) Filed: Feb. 19, 2024

(65) Prior Publication Data

US 2025/0208417 A1 Jun. 26, 2025

(30) Foreign Application Priority Data

Dec. 20, 2023 (TW) ................................ 112149878

(51) Int. Cl.
*G02B 27/01* (2006.01)
*G02B 26/08* (2006.01)
(Continued)

(52) U.S. Cl.
CPC ..... *G02B 27/0172* (2013.01); *G02B 26/0825* (2013.01); *G02B 27/0006* (2013.01);
(Continued)

(58) Field of Classification Search
CPC .............. G09G 3/007; G09G 3/02–025; G06T 19/006; G02B 26/0816; G02B 26/0825;
(Continued)

(56) References Cited

U.S. PATENT DOCUMENTS 6,249,391 B1 * 6/2001 Hayakawa ......... G02B 17/0832
359/720
9,575,318 B2 2/2017 Choi et al.
(Continued)

FOREIGN PATENT DOCUMENTS

CN 218956921 5/2023
CN 116360106 6/2023
(Continued)

OTHER PUBLICATIONS

"Office Action of Taiwan Counterpart Application", issued on Sep. 20, 2024, p. 1-p. 10.
(Continued)

*Primary Examiner* — Keith L Crawley
(74) *Attorney, Agent, or Firm* — JCIPRNET

(57) ABSTRACT

Disclosed is a near-eye display device including an image generating device, an optical prism element and a partial reflective optical element. The optical prism element is a relay optical element arranged on the transmission path of the image light from the image generating device to guide the image light. The optical prism element includes a first refractive surface, a first reflective surface, a second reflective surface, a plane mirror and a second refractive surface that guide the image light in sequence. The surfaces are eccentric to each other and form an interior filled with a medium having a refractive index greater than 1. The partial reflective optical element is arranged on the transmission path of the image light from the optical prism element. The partial reflective optical element is an optical combiner adapted to guide the image light and external ambient light toward an exit pupil.

17 Claims, 14 Drawing Sheets

(51) Int. Cl.

| | | |
|---|---|---|
| *G02B 27/00* | (2006.01) | |
| *G02B 27/09* | (2006.01) | |
| *G02B 27/14* | (2006.01) | |

(52) U.S. Cl.
CPC ......... *G02B 27/0972* (2013.01); *G02B 27/14* (2013.01); *G02B 2027/0178* (2013.01)

(58) Field of Classification Search
CPC ...... G02B 26/0875–0891; G02B 26/10; G02B 26/108; G02B 27/0006; G02B 27/017–0179; G02B 27/095–0977; G02B 27/12–14; G02B 2027/0178
See application file for complete search history.

(56) References Cited

U.S. PATENT DOCUMENTS

| | | | |
|---|---|---|---|
| 11,256,092 B2 | 2/2022 | Shamir et al. | |
| 2007/0273983 A1* | 11/2007 | Hebert | G02B 27/0172 |
| | | | 359/708 |
| 2014/0240843 A1 | 8/2014 | Kollin | |
| 2016/0154245 A1 | 6/2016 | Gao et al. | |
| 2018/0143427 A1 | 5/2018 | Griffin et al. | |
| 2019/0121132 A1* | 4/2019 | Shamir | G02B 27/0977 |
| 2019/0212563 A1* | 7/2019 | Schultz | G02B 27/0081 |
| 2020/0225486 A1 | 7/2020 | Jones et al. | |
| 2021/0325673 A1* | 10/2021 | Kashter | G02B 27/0101 |
| 2022/0179217 A1* | 6/2022 | Macken | G02B 27/0172 |
| 2022/0269081 A1* | 8/2022 | Cakmakci | G02B 6/0065 |
| 2023/0078819 A1* | 3/2023 | Cakmakci | G02B 6/0033 |
| | | | 359/630 |
| 2023/0125258 A1* | 4/2023 | Connor | G02F 1/19 |
| | | | 359/263 |
| 2023/0251494 A1* | 8/2023 | Cai | G02B 27/10 |
| | | | 345/8 |

FOREIGN PATENT DOCUMENTS

| | | |
|---|---|---|
| TW | 202011080 | 3/2020 |
| WO | 2018165123 | 9/2018 |

OTHER PUBLICATIONS

Bernard C. Kress, "Digital optical elements and technologies (EDO19): applications to AR/VR/MR", Proceedings of SPIE, Digital Optical Technologies 2019, Jul. 30, 2019, pp. 1106222-1 to 106222-13, vol. 11062.

* cited by examiner

NEAR-EYE DISPLAY DEVICE WITH RELAY OPTICAL PRISM AND OPTICAL COMBINER

CROSS-REFERENCE TO RELATED APPLICATION

This application claims the priority benefit of Taiwan application serial no. 112149878, filed on Dec. 20, 2023. The entirety of the above-mentioned patent application is hereby incorporated by reference herein and made a part of specification.

BACKGROUND

Technical Field

The present disclosure relates to a display device, and in particular, to a near-eye display device.

Description of Related Art

Augmented reality technology is a technology that spatially visualizes various types of information in the real world. Also, augmented reality technology provides users with virtual information through images, videos, 3D models and other content, thereby enhancing perception and interaction of the user with the real physical world. A near-eye display device is the core part of realizing augmented reality technology. This type of near-eye display device is normally characterized in an optical combiner (such as a beam splitter, a partial reflector, a prism or a waveguide element) placed in front of the user's eyes to guide the image projection light from the display and the external ambient light to the user's eyes. Therefore, users may simultaneously observe the virtual information generated by the image light and the view of physical world formed by the diffuse reflection of external ambient light.

However, currently there are difficult technical challenges in manufacturing near-eye display devices. For example, in order to obtain better optical effects, more complex optical elements are required to improve the optical imaging quality and field of view, which is obviously contradictory with the requirements for reducing the weight and improving compactness of near-eye display devices. In another example, the configuration and appearance design of the near-eye display device need to be similar to the profile of ordinary glasses, and the weight distribution should be more ergonomic, thereby improving the user's wearing experience and meeting the needs of the consumer market. Furthermore, in order to allow the user to wear the near-eye display device for a longer time, how to improve the optical efficiency of the device is also one of the important issues in the development of technology in related fields. In the field of near-eye display design, lower f-number and wide FOV have always been regarded as one of the most important indicators. Lower f-number means that the optical system has higher luminous flux, and wide FOV brings a better viewing experience to users. However, due to the miniaturization requirements of near-eye displays, the resolving power of the optical system must be improved, making it very difficult to design a near-eye display device with both a lower f-number and wide FOV. For example, the viewing angle of the birdbath optical system may be in a range from 40° to 45°, but a microdisplay is located above the beam splitter, so it is difficult to effectively reduce the focal length to improve the f-number, which is approximately above 2.5, and there is still a certain thickness and volume at the top of optical system. Even if a diffraction waveguide element that looks similar to ordinary glasses is adopted as a solution, the viewing angle of the micro optical projection system can only be in the range of 27° to 30° to ensure resolving power under the condition of small volume (for example, 0.4c.c.) and a f-number of 1.8. Therefore, it would be a significant improvement to have the ability of providing a compact and light-weight near-eye display with both lower f-number and wide FOV.

SUMMARY

The present disclosure provides a near-eye display device, which has an optical structure with a lower f-number and wide FOV, which is conducive to reduce the size and weight, and the arrangement thereof is suitable for ordinary glasses styling. This device may achieve good image quality and field of view, as well as excellent optical efficiency.

The disclosure provides a near-eye display device including an image generating device, an optical prism element and a partial reflective optical element. The image generating device is adapted to provide an image light. The optical prism element is a relay optical element arranged on the transmission path of the image light from the image generating device to guide the image light. The optical prism element includes a first refractive surface, a first reflective surface, a second reflective surface, a plane mirror and a second refractive surface that guide the image light in sequence. The surfaces are eccentric to each other and form an interior filled with a medium having a refractive index greater than 1. The partial reflective optical element is arranged on the transmission path of the image light from the optical prism element. The partial reflective optical element is an optical combiner adapted to guide the image light and external ambient light toward an exit pupil. When the observer's eyes are placed in the exit pupil, it is possible to see the enlarged virtual image formed by the converged image light.

In order to make the above-mentioned features and advantages of the present disclosure more obvious and easy to understand, embodiments are given below and are described in detail below with reference to the accompanying drawings.

DESCRIPTION OF THE EMBODIMENTS

Figure 1:
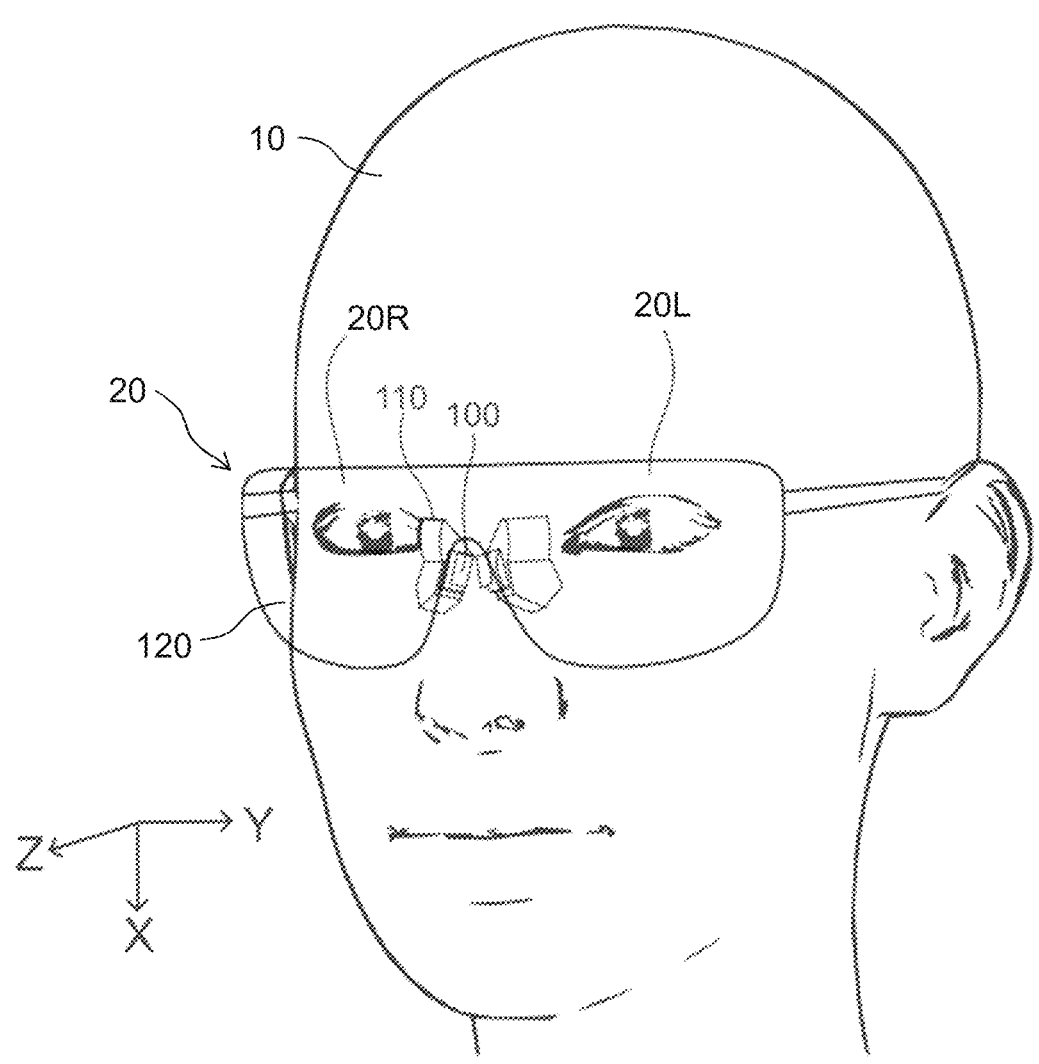
FIG. 1 is a schematic view of the appearance of a near-eye display device in a wearing state according to an embodiment of the present disclosure.

FIG. 1 is a schematic view of an appearance of a near-eye display device in a wearing state according to an embodiment of the present disclosure. Please refer to FIG. 1. This embodiment provides a near-eye display device 20, which is a wearable display with the appearance of glasses, so that an observer 10 is able to see a virtual image. In FIG. 1, X, Y and Z are an orthogonal coordinate system, the +Y direction is the horizontal axis corresponding to the arrangement direction of the eyes EYE of the observer 10 of the near-eye display device 20, the +X direction is the longitudinal axis corresponding to the direction perpendicular to the arrangement direction of the eyes EYE of the observer 10 with facing downward, and the +Z direction corresponds to the vertical axis of the observer 10 facing straight ahead.

The near-eye display device 20 includes a first display device 20R for the right eye and a second display device 20L for the left eye. The first display device 20R and the second display device 20L are mirror symmetrical in the XZ plane. For ease of explanation, the first display device 20R for the right eye will be described as a representative near-eye display device in the following description.

Figure 2A:
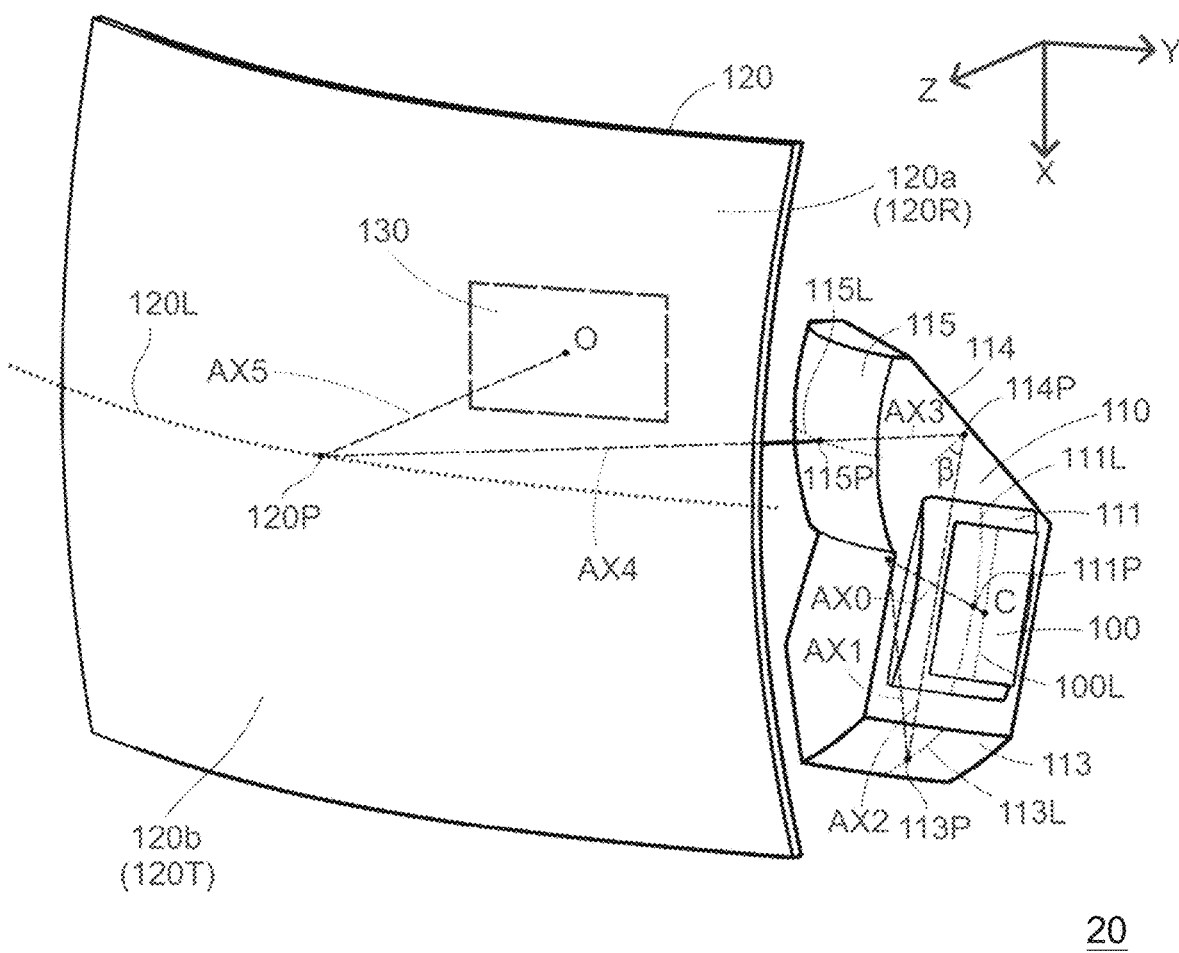
FIG. 2A and FIG. 2B are respectively three-dimensional schematic views of the near-eye display device in FIG. 1 at different directions.
Figure 2B:
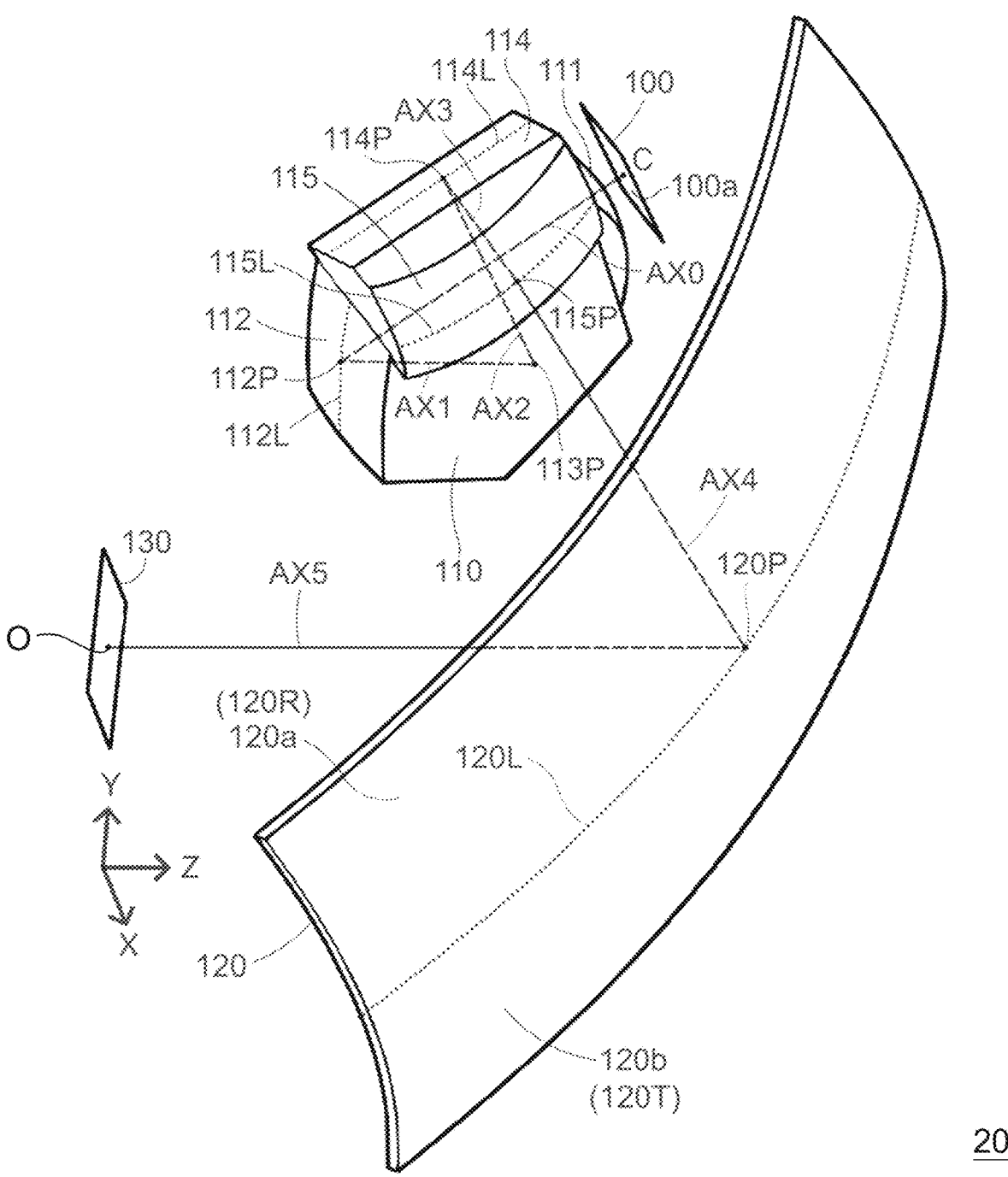

FIG. 2A and FIG. 2B are respectively three-dimensional schematic views of the near-eye display device in FIG. 1 at different directions. Please refer to FIG. 2A and FIG. 2B. The near-eye display device 20 has an image generating device 100, an optical prism element 110, and a partial reflective optical element 120. The optical prism element 110 has a first refractive surface 111, a first reflective surface 112, a second reflective surface 113, a plane mirror 114 and a second refractive surface 115 that guide the image light from the image generating device 100 in sequence. The partial reflective optical element 120 is used to guide the image light from the optical prism element 110 toward the exit pupil 130.

The image generating device 100 includes a display element and a display control circuit. The operation method may be, for example, driving a microdisplay through a display control circuit to generate a color static image or a dynamic image on the display plane 100a of the display element. It should be noted that the image generating device 100 may be a self-luminous display device, such as an organic light-emitting diode (OLED) display panel, a micro light-emitting diode (micro-LED) display panel, or a light modulation type display device, such as a liquid crystal display panel, a liquid-crystal-on-silicon panel (LCOS panel), a digital micro-mirror device (DMD) or other spatial light modulator (SLM), the present disclosure is not limited thereto.

FIG. 2A and FIG. 2B may illustrate the detailed configuration of various components in the near-eye display device 20. The position of the image center C of the image generating device 100 is located on the projection optical axis AX0. The position of the surface reference point 111P of the first refractive surface 111 is defined as one side on the projection optical axis AX0 close to the image generating device 100. The position of the surface reference point 112P of the first reflective surface 112 is defined as the intersection point on the projection optical axis AX0 connecting the projection optical axis AX1. The position of the surface reference point 113P of the second reflective surface 113 is defined as the intersection point on the projection optical axis AX1 connecting the projection optical axis AX2. The position of the surface reference point 114P of the reflective surface 114 is defined as an intersection point on the projection optical axis AX2 connecting the projection optical axis AX3. The position of the surface reference point 115P of the second refractive surface 115 is defined as the intersection point on the projection optical axis AX3 connecting the projection optical axis AX4. The position of the surface reference point 120P of the partial reflective optical element 120 is defined as the intersection point on the projection optical axis AX4 connecting the projection optical axis AX5. The position of the center point O of the exit pupil 130 is defined as one side of the projection optical axis AX5 close to the eye EYE of the observer 10.

The projection optical axes AX0~AX5 are the paths which the light rays (i.e., image light) travel through along the optical axis. The projection optical axis AX0 is a straight-line distance from the image center C through the surface reference point 111P to the surface reference point 112P, and a direction thereof is perpendicular to the display plane 100a of the image generating device 110 and also coincides with the normal direction of the surface reference point 111P located on the first refractive surface 111. The projection optical axis AX1 is the straight-line distance from the surface reference point 112P to the surface reference point 113P, and the direction thereof is the reflection direction after the projection optical axis AX0 is incident on the surface reference point 112P on the first reflective surface 112. The projection optical axis AX2 is the straight-line distance from the surface reference point 113P to the surface reference point 114P, and the direction thereof is the reflection direction after the projection optical axis AX1 is incident on the surface reference point 113P on the second reflective surface 113. The projection optical axis AX3 is the straight-line distance from the surface reference point 114P to the surface reference point 115P, and the direction thereof is the reflection direction of the projection optical axis AX2 after being incident on the surface reference point 114P on the plane mirror 114. The projection optical axis AX4 is the straight-line distance from the surface reference point 115P to the surface reference point 120P, and the direction thereof is the refraction direction after the projection optical axis AX3 is incident on the surface reference point 115P on the second refractive surface 115. The projection optical axis AX5 is the straight-line distance from the surface reference point 120P to the center point O of the exit pupil 130, and the direction thereof is the reflection direction of the projection optical axis AX4 after being incident on the surface reference point 120P on the partial reflective optical element 120.

The optical prism element 110 is a composite optical element with the functions of a reflective mirror and a refractive lens. The optical prism element 110 may be formed by injection of optical level plastic, or may be formed by grinding or molding glass. The disclosure is not limited thereto.

In addition to other surfaces except the plane mirror 114, namely the first refractive surface 111, the first reflective surface 112, the second reflective surface 113 and the second refractive surface 115, the optical surfaces of the optical prism element 110 may be composed of free-form surfaces respectively, but not limited to free-form surfaces, the optical surfaces of the optical prism element 110 may also be aspherical. In the optical prism element 110, by configuring the first refractive surface 111, the first reflective surface 112, the second reflective surface 113, and the second refractive surface 115 as free-form surfaces or aspherical surfaces, it is possible to reduce aberrations. Especially when a free-form surface is adopted, the aberration of the near-eye display device 20 which is an off-axis optical system may be effectively reduced. Moreover, the free-form surface is a surface that does not have an axis of rotational symmetry, and the surface function of the free-form surface may be expressed by various polynomials. Furthermore, an aspheric surface is a surface having an axis of rotational symmetry, and is a surface other than a paraboloid or a spherical surface represented by a polynomial.

The plane mirror 114 is a plane, and is only used to change the traveling direction of image light, so that the optical prism element 110 may be placed on the left and right sides of the nose bridge of the observer 10, and has an appropriate reflection angle β to make the optical prism element 110 conform to the inclination angle of the nose bridge of the observer 10.

The above-mentioned free-form surface has the characteristics of being asymmetrical in one direction and symmetrical in the other direction, or may be described as having the characteristics of line symmetry. Specifically, as shown in FIG. 2A, the first refractive surface 111 has a plane symmetry line 111L, and the plane functions on both sides of the plane symmetry line 111L have symmetrical characteristics. By analogy, the first reflective surface 112 has a plane symmetry line 112L, the second reflective surface 113 has a plane symmetry line 113L, the plane mirror 114 has a plane symmetry line 114L, the reflective surface 115 has a plane symmetry line 115L, the surface functions located on both sides have symmetrical characteristics.

The first reflective surface 112, the second reflective surface 113 and the plane mirror 114 of the optical prism element 110 are high reflectivity surfaces composed of metal films or dielectric multi-layer films, and reflectivity thereof is greater than or equal to 97%. In a preferred embodiment, the reflectivity of the high reflectivity surface is greater than or equal to 99%. The first refractive surface 111 and the second refractive surface 115 have anti-reflective films composed of destructive interference dielectric multilayer films. The above-mentioned films may be realized through resistive thermal evaporation or ion-assisted deposition processes and so on, and the present disclosure is not limited thereto. Through the configuration of each functional surface in the optical prism element 110, the optical paths may be overlapped, thereby achieving a more compact structure, which facilitates the miniaturization of the optical system. The detailed implementation description will be provided in the following paragraphs.

The partial reflective optical element 120 has an inner surface 120a and an outer surface 120b. Like the optical surface of the above-mentioned optical prism element 110, the inner surface 120a and the outer surface 120b may each be composed of a free-form surface.

Similar to the optical prism element 110, the partial reflective optical element 120 is also characterized in line symmetry. The inner surface 120a has a plane symmetry line 120L, and the surface function divided into two sides thereby is characterized in symmetry, which also applies to the outer surface 120b, so no details will be given.

There is a partially reflective partially penetrating film 120R on the inner surface 120a, which may be composed of a metal film or a dielectric multi-layer film. It should be noted that the ratio of reflection to transmission of the partially reflective partially penetrating film 120R may be adjusted. Common reflection to transmission ratios are normally between R20/T80 and R80/T20. The outer surface 120b has an anti-reflective film 120T composed of a destructive interference dielectric multilayer film. The above-mentioned partially reflective partially penetrating film 120R and anti-reflective film 120T may also be realized through resistive thermal evaporation or ion-assisted deposition processes and so on, and the present disclosure is not limited thereto. Therefore, the external ambient light may be incident through the anti-reflection film 120T on the outer surface 120b with almost no loss, and then penetrate through the partially reflective partially penetrating film 120R on the inner surface 120a before entering the eyes EYE of the observer 10, which may make the virtual image overlap with the external scene.

In order to obtain better optical efficiency, the partially reflective partially penetrating film 120R on the inner surface 120a of the partial reflective optical element 120 may also be designed to have wavelength bandpass reflection characteristics. That is to say, an optical film that reflects all or most of the light within a specific wavelength range and transmits all light outside the specific wavelength range is referred to as a bandpass reflective film or a notch filter. The detailed implementation will be described in the following paragraphs.

Some common functional optical coatings may also be plated on the inner surface 120a and the outer surface 120b, such as anti-smudge coating, anti-fogging coating or hard coating to ensure convenience and safety of use.

Figure 3:
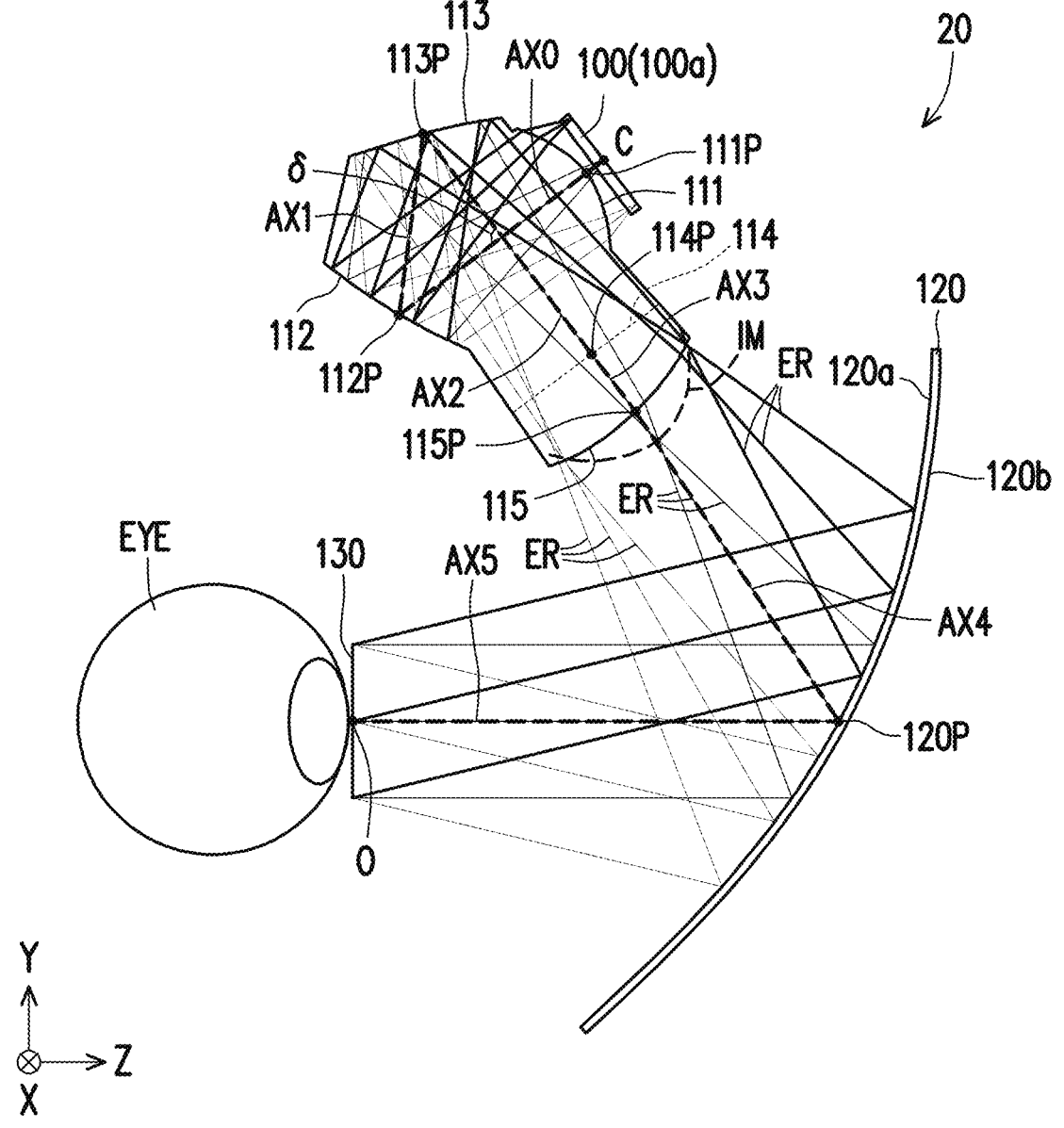
FIG. 3 is an expanded schematic view of the equivalent optical path of the near-eye display device of FIG. 1.

FIG. 3 is a schematic diagram of an equivalent optical path expansion of the near-eye display device of FIG. 1. Please refer to FIG. 3. Since the plane mirror 114 is only used to change the direction of the optical path, the plane mirror 114 does not affect the optical performance. For ease of explanation, the configuration of the plane mirror 114 is omitted in the schematic diagram of FIG. 3 and is represented by an equivalent optical path instead.

The image light ER emitted from the image generating device 100 is transmitted to the first reflective surface 112 through the first refractive surface 111 and then reflected to form a state close to a parallel beam. The second reflective surface 113 converges the image light ER emitted from the first reflective surface 112, and is incident toward the second refractive surface 115, and is finally refracted by the second refractive surface 115 and emitted simultaneously. The partial reflective optical element 120 reflects the image light ER emitted from the optical prism element 110 toward the exit pupil 130 to form the exit pupil 130. The image light ER from each point on the display plane 100a will travel in a divergent, parallel or convergent state on each surface or medium of the above-mentioned optical element according to the laws of physics, and finally overlap and incident onto the position of the exit pupil 130 on the angular direction corresponding to the effective focal length of the optical system. When the eye EYE of the observer is located in the exit pupil 130, the observer may see the enlarged virtual image formed by the convergence of the image light ER.

The optical path of the near-eye display device 20 shown in FIG. 3 is the result of optical simulation using a reverse ray tracing method. Reverse ray tracing assumes that the image light ER passing through the exit pupil 130 passes through the partial reflective optical element 120 and the optical prism element 110 and then converges and forms an image on the display plane 100a of the image generating device 100. It should be noted that the center point O of the exit pupil 130 is the origin of the reference coordinates.

The optical system of the near-eye display device 20 belongs to a pupil forming system, so the optical path will form an intermediate image IM through a relay optical element in the system. The use of this type of optical system may prevent the system's viewing angle from being limited by the total optical length of the system, and may effectively expand the system's viewing angle in long-length optical systems. As shown in FIG. 3, the intermediate image IM formed by the near-eye display device 20 is between the partial reflective optical element 120 and the optical prism element 110. By forming the intermediate image IM near the optical prism element 110, the weights of the correction aberration of the partial reflective optical element 120 and of the optical prism element 110 may be effectively adjusted, which is more helpful to suppress the aberration of the observed virtual image.

The intermediate image IM is a real image formed at a conjugate position with the display plane 100*a* of the image generating device 100. The intermediate image IM has a mapping pattern corresponding to the display on the display plane 100*a*, but does not need to be clearly imaged, and may have optical aberrations such as spherical aberration, coma aberration, field curvature, and distortion. It would suffice as long as the relevant optical element parameters are properly adjusted and the virtual image aberration observed at the exit pupil 130 can be well corrected.

In this embodiment, the near-eye display device 20 exhibits an off-axis optical system on the YZ plane and an on-axis optical system on the XZ plane. The first refractive surface 111 shown in FIG. 3 is an aspheric surface, and the first reflective surface 112, the second reflective surface 113 and the second refractive surface 115 are free-form surfaces. The local reference point of each surface is set on the projection optical axis. The surface equation of the free-form surface may be expressed by the following polynomial (1):

$$z = \frac{c(x^2 + y^2)}{1 + \sqrt{1 - (1+k)c^2(x^2 + y^2)}} + \sum_{j=2}^{66} C_j x^m y^n, \quad (1)$$

$$j = \frac{[(m+n)^2 + m + 3n]}{2} + 1$$

wherein
z is a sag of the measured surface contour of the Z axis in the local XYZ coordinate system;
c is a radius of curvature of the surface;
k is a conic coefficient;
$C_j$ is an $x^m y^n$ coefficient of the polynomial.

It should be noted that the x-th power term m must be an even number to comply with the above requirements of the (symmetric) system on the XZ plane as the axis. The YX surface is exhibited as an off-axis (asymmetric) system, so the y-th power term n is not limited to even numbers, but may also be odd numbers. The surface equation of an aspheric surface may be expressed by the following polynomial (2):

$$z = \frac{cr^2}{1 + \sqrt{1 - (1+k)c^2 r^2}} + Ar^4 + Br^6 + Cr^8 + Dr^{10}, \quad (2)$$

8

-continued
$$r = \sqrt{x^2 + y^2}$$

wherein
z is a sag of the measured surface contour of the Z axis in the local XYZ coordinate system;
c is a radius of curvature of the surface;
k is a conic coefficient;
A, B, C, and D are the aspheric coefficients of the 4th, 6th, 8th, and 10th orders respectively.

The surface parameters of the near-eye display device 20 are as described in Tables 1 to 4 below. Table 1 is an overview of each optical surface, Table 2 is the reference point configuration of each optical surface, Table 3 is the surface coefficient of the aspheric surface, and Table 4 is surface parameters of free-form surfaces. In this embodiment, the field of view (FOV) of the near-eye display device 20 is 30.8°. The virtual image display area of the near-eye display device 20 is a rectangle, and the 30.8° is the angle in the diagonal direction. The exit pupil 130 measures an 8 mm×6 mm rectangular area.

TABLE 1 f(focal length) = −16.42 mm, Fno(f-number) = 1.44, FOV = 30.8°

| Surface | Type | Radius of curvature | Material | Action |
|---|---|---|---|---|
| 130 | Spherical | Infinite | — | — |
| 120a | XY polynomial surface | −44.931 | — | Reflection |
| 115 | XY polynomial surface | −18.623 | Optical resin | Refraction |
| (114) | (Spherical) | (Infinite) | (Optical resin) | (Reflection) |
| 113 | XY polynomial surface | −275.329 | Optical resin | Reflection |
| 112 | XY polynomial surface | −34.723 | Optical resin | Reflection |
| 111 | Aspherical | 6.441 | — | Refraction |
| Cover glass | Spherical | Infinite | Glass | Refraction |
| 100a | Spherical | Infinite | — | — |

TABLE 2

| Surface reference point | Global coordinates | | | Local axis Rotation angle (°) | |
|---|---|---|---|---|---|
| | X | Y | Z | α (x-axis) | β (y-axis) |
| O | 0 | 0 | 0 | 0 | 0 |
| 120P | 0 | 0 | 31.701 | 21.486 | 0 |
| 115P | 0 | 19.981 | 18.451 | 4.994 | 0 |
| (114P) | (0) | (25.451) | (14.411) | (0) | (40) |
| 113P | 0 | 38.328 | 4.911 | 24.147 | 0 |
| 112P | 0 | 26.524 | 3.016 | 23.284 | 0 |
| 111P | 0 | 35.699 | 15.478 | −4.1829 | 0 |
| Cover glass | 0 | 36.104 | 16.028 | 0 | 0 |
| C | 0 | 36.519 | 16.591 | 0 | 0 |

TABLE 3

| | Aspheric coefficient | | | | |
|---|---|---|---|---|---|
| Surface | k | A | B | C | D |
| 111 | −0.765 | −2.300e−04 | −2.163e−05 | 6.347e−07 | −4.629e−09 |

TABLE 4

| Coefficient | Annotation | Surface | | | |
|---|---|---|---|---|---|
| | | 120a | 115 | 113 | 112 |
| CR | Normalized Radius | 1.000 | 1.000 | 1.000 | 1.000 |
| C1 | $k$ | −2.518 | −0.533 | −30.000 | 8.728 |
| C3 | $y$ | 1.182e−01 | 5.945e−03 | −1.327e−02 | −5.517e−02 |
| C4 | $x^2$ | 4.526e−04 | −1.550e−03 | 7.902e−03 | −7.275e−03 |
| C6 | $y^2$ | 6.669e−04 | 2.148e−03 | 1.181e−02 | 2.580e−03 |
| C8 | $x^2y$ | −8.877e−05 | −6.034e−03 | −1.685e−04 | −2.992e−04 |
| C10 | $y^3$ | −2.361e−05 | 1.868e−04 | 2.482e−05 | −6.952e−05 |
| C11 | $x^4$ | −5.690e−07 | −1.302e−04 | −3.797e−05 | 1.271e−05 |
| C13 | $x^2y^2$ | −9.395e−07 | −1.863e−04 | −5.513e−05 | 1.687e−05 |
| C15 | $y^4$ | −3.573e−07 | −1.187e−04 | −2.176e−05 | 4.571e−06 |
| C17 | $x^4y$ | 7.421e−08 | −2.281e−06 | 9.269e−08 | −4.442e−06 |
| C19 | $x^2y^3$ | 6.767e−08 | 8.217e−06 | 1.077e−06 | 1.036e−06 |
| C21 | $y^5$ | 0 | 0 | −7.857e−07 | 2.722e−07 |
| C22 | $x^6$ | 0 | 0 | −5.205e−07 | −6.117e−06 |
| C24 | $x^4y^2$ | 1.073e−09 | 1.991e−06 | 2.074e−06 | 4.015e−06 |
| C26 | $x^2y^4$ | 9.619e−10 | −6.921e−07 | 5.890e−07 | 1.494e−06 |
| C28 | $y^6$ | 0 | 0 | 9.553e−07 | 6.255e−07 |
| C30 | $x^6y$ | 0 | 0 | −3.932e−08 | 2.120e−06 |
| C32 | $x^4y^3$ | 0 | 0 | −1.297e−07 | −2.273e−07 |
| C34 | $x^2y^5$ | 0 | 0 | −1.896e−07 | 1.109e−08 |
| C36 | $y^7$ | 0 | 0 | 3.260e−08 | 3.403e−08 |
| C37 | $x^8$ | 0 | 0 | 1.807e−07 | 2.414e−06 |
| C39 | $x^6y^2$ | 0 | 0 | −2.512e−07 | −7.180e−07 |
| C41 | $x^4y^4$ | 0 | 0 | −1.374e−07 | −1.589e−07 |
| C43 | $x^2y^6$ | 0 | 0 | −1.038e−07 | −4.406e−08 |
| C45 | $y^8$ | 0 | 0 | −7.542e−08 | −8.049e−09 |
| C47 | $x^8y$ | 0 | 0 | 2.079e−09 | −2.842e−07 |
| C49 | $x^6y^3$ | 0 | 0 | −2.640e−09 | −2.527e−08 |
| C51 | $x^4y^5$ | 0 | 0 | 1.006e−08 | 3.853e−08 |
| C53 | $x^2y^7$ | 0 | 0 | 7.577e−09 | −3.250e−09 |
| C55 | $y^9$ | 0 | 0 | 7.481e−11 | −1.290e−09 |
| C56 | $x^{10}$ | 0 | 0 | −1.007e−08 | −2.565e−07 |
| C58 | $x^8y^2$ | 0 | 0 | 9.545e−09 | 6.293e−08 |
| C60 | $x^6y^4$ | 0 | 0 | 3.765e−09 | −8.934e−09 |
| C62 | $x^4y^6$ | 0 | 0 | 6.174e−09 | 1.425e−08 |
| C64 | $x^2y^8$ | 0 | 0 | 3.186e−09 | 5.430e−10 |
| C66 | $y^{10}$ | 0 | 0 | 1.809e−09 | 5.192e−11 |

The reflection area of the reflected image light ER in the first reflective surface 112 has a concave shape, and the second reflective surface 113 also has a concave shape. That is, the optical prism element 110 has a structure of two concave reflecting surfaces. In this way, the optical power of the near-eye display device 20 may be dispersed evenly, thereby reducing the burden of aberration correction, thus improving the aberration correction capability. On the other hand, by adjusting the X-axis rotation angle of the first reflective surface 112 and the second reflective surface 113, the chief ray incident on the first reflective surface 112 (on the projection optical axis AX0) and the chief ray (on the projection optical axis AX2) exiting the second reflective surface 113 intersect with each other to form an angle δ. The range of the angle δ is set to be between 85° and 95° to make the structure of the optical prism element 110 more compact. In the meantime, the width of the turning image light ER is reserved for the plane mirror 114 to avoid mechanical interference with the first refractive surface 111 and the first reflective surface 112.

In addition, as shown in FIG. 3, by properly adjusting the straight-line distance from the reference point 113P of the second reflective surface 113 to the reference point 115P of the second refractive surface 115, the intermediate image IM may be formed on the exit side of the second refractive surface 115, so that the image light expanded through the intermediate image IM may undergo aberration correction based on the surface of the partial reflective optical element 120. This distance may be controlled within 22.0 mm to 23.0 mm, which is exactly sufficient to form the intermediate image IM outside the second refractive surface 115 and provide a sufficient length for the plane mirror 114 to turn the optical path.

Figure 4:
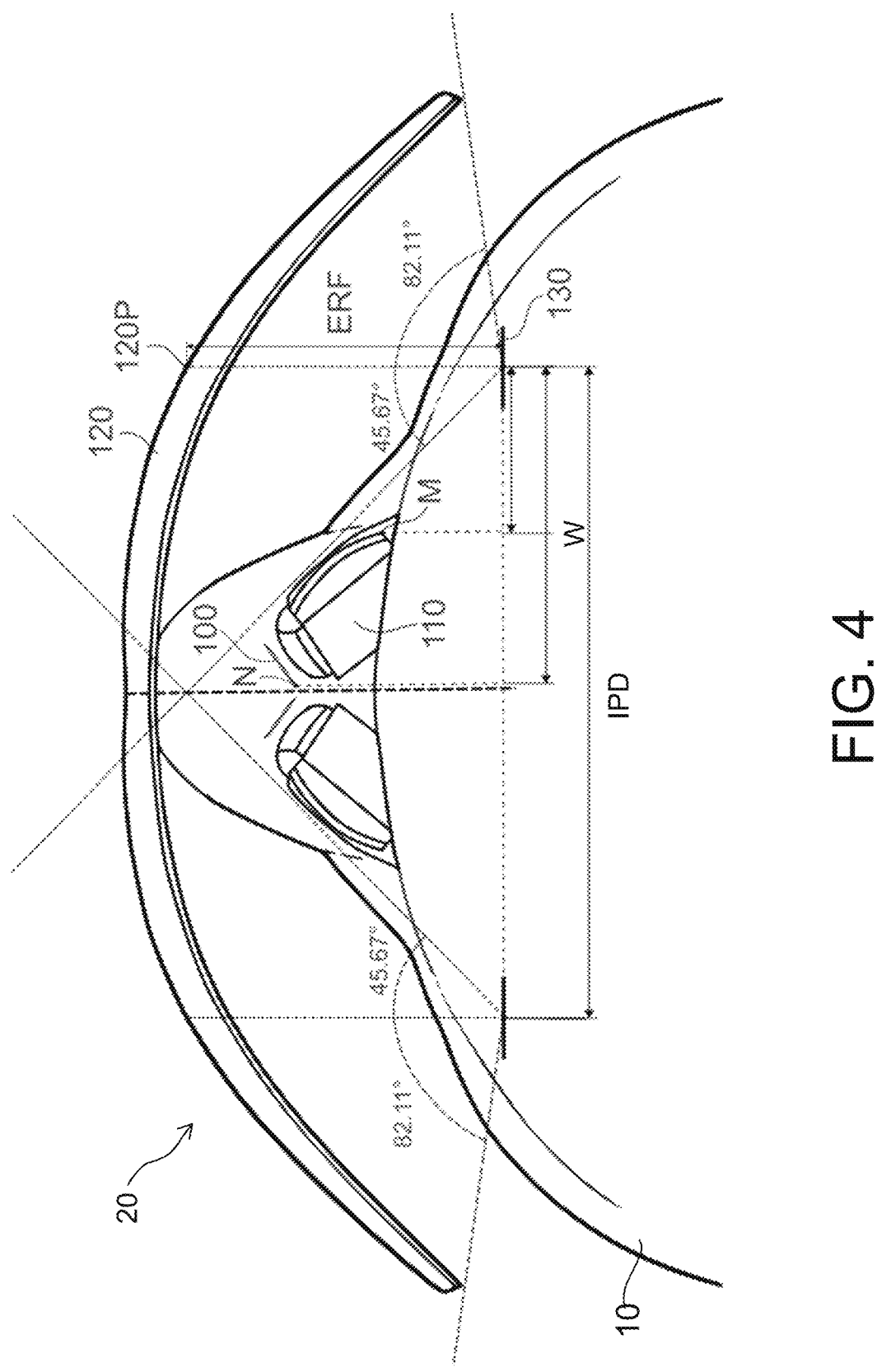
FIG. 4 is a schematic top view of the near-eye display device in FIG. 1 in a wearing state.

FIG. 4 is a schematic top view of the near-eye display device in FIG. 1 in a wearing state. Please refer to FIG. 2A and FIG. 4. In addition to the above-mentioned optical and mechanical factors, it is also necessary to take into account the wearing requirement for human body, that is, the near-eye display device 20 should not block the field of view of the eye EYE, nor should the near-eye display device 20 interfere with any tissue on the head. In this embodiment, the human interpupillary distance IPD is set to 65 mm. The optical prism element 110 is placed close to the nose bridge, and the reflection angle β of the plane mirror 114 is set between 35° and 40° to match the inclination angle of the nose bridge of the observer 10. The projection distance S between the reference point M on one side of the edge of the second refractive surface 115 closest to the exit pupil 130 and the center point O of the exit pupil 130 on the interpupillary distance IPD should be set greater than 15.5 mm to prevent the eye EYE from being blocked. The projection distance W between the reference point N closest to the nose bridge of the observer 10 and the center point O of the exit pupil 130 of the image generating device 100 on the interpupillary distance IPD should be set to less than 31.5 mm to reserve space to facilitate the mechanism design. The straight-line distance ERF between the reference point 120P of the partial reflective optical element 120 and the center point O of the exit pupil 130 should be set in an appropriate range to accommodate the mechanism configuration of the prescription lens, and this range may be controlled between 30 mm and 32 mm. For example, in this embodiment, if the interpupillary distance IPD is set to 65 mm, the projection distance W is 31.45 mm and the projection distance S is 16.7 mm.

On the other hand, it may be derived from FIG. 4 that the horizontal field of view of the right eye of the observer 10 is approximately 45.67° to the left of the straight-line distance ERF shown in the figure, and the horizontal field of view of the right eye EYE is approximately 82.11° to the right of the straight-line distance ERF shown in the figure. The condition of left eye is similar to that of the right eye, but they are on opposite sides. Therefore, the total horizontal field of view of a single eye EYE of the observer 10 wearing the near-eye display device 20 will reach approximately 127.78°.

Figure 5:
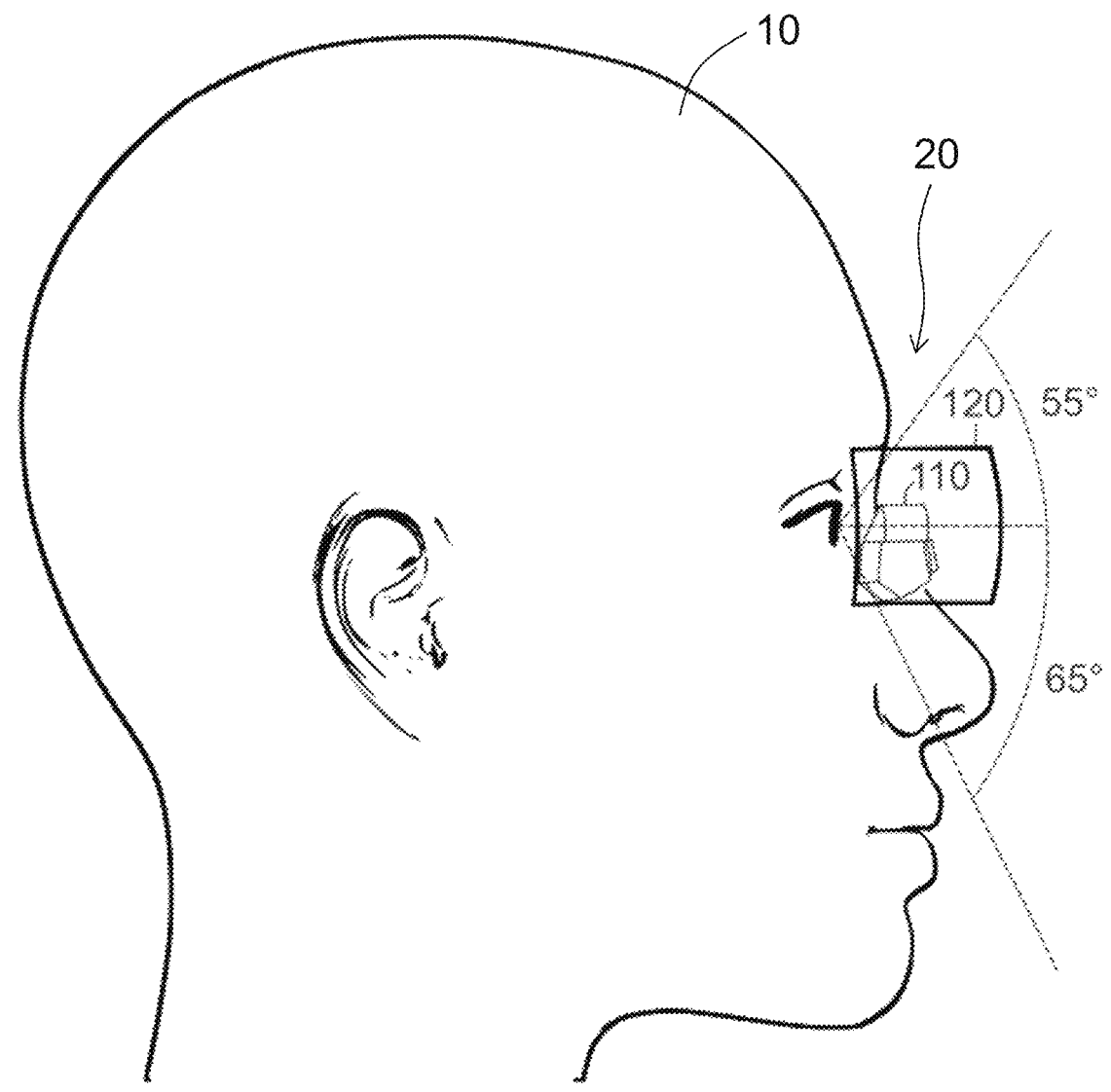
FIG. 5 is a schematic side view of the near-eye display device in FIG. 1 in a wearing state.

FIG. 5 is a schematic side view of the near-eye display device in FIG. 1 in a wearing state. Please refer to FIG. 5. The vertical vision field of view of the right eye of the observer is approximately 55° above the straight-line distance ERF, and the vertical vision field of view of the right eye is approximately 65° below the straight-line distance ERF. It can be derived from this that the total vertical field of view of a single eye of the observer 10 wearing the near-eye display device 20 will be as large as about 120°.

Figure 6:
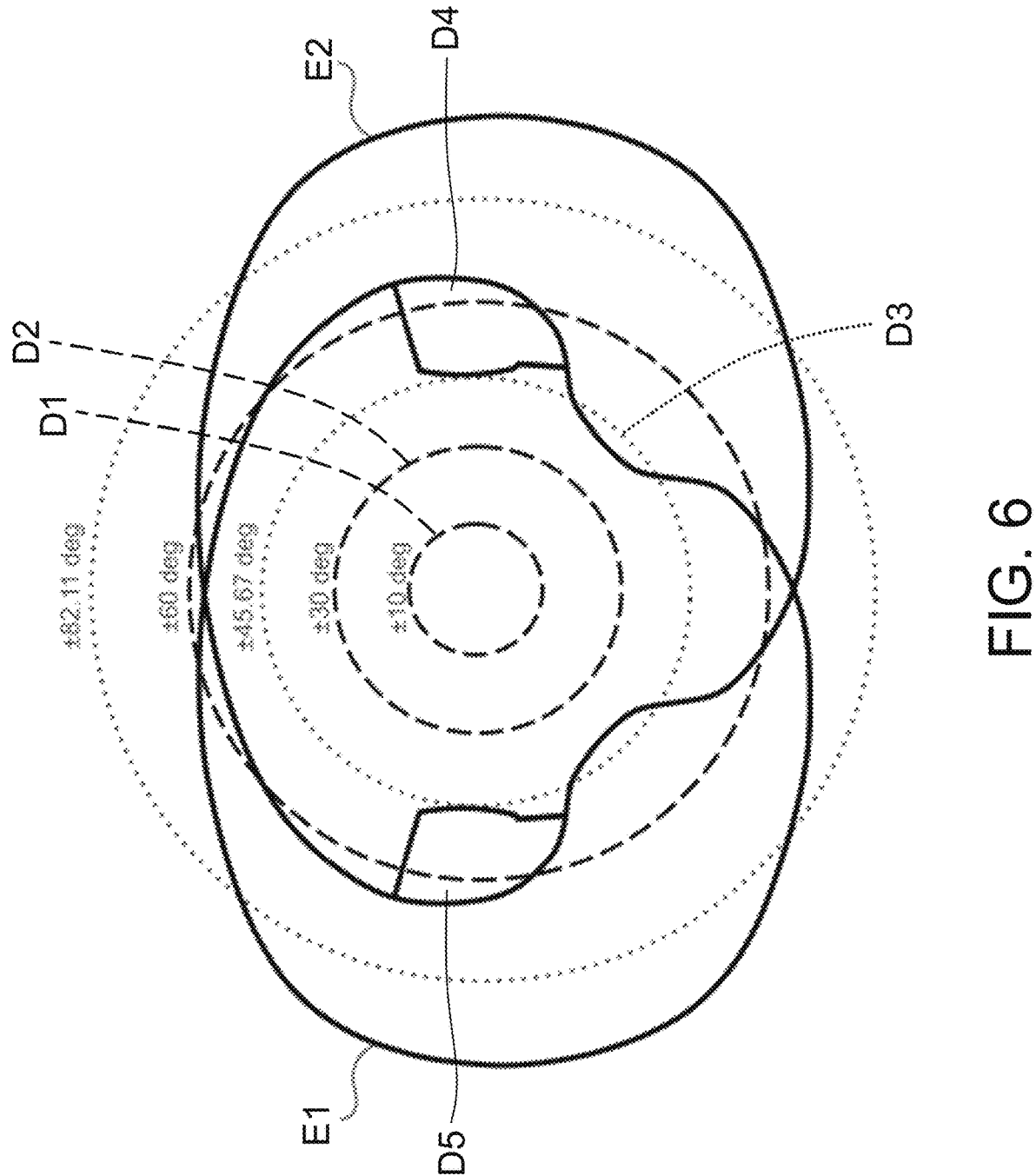
FIG. 6 is a schematic view of a relationship between a binocular vision area and a field of view of an observer wearing the near-eye display device of FIG. 1.

FIG. 6 is a schematic diagram of the relationship between the binocular vision area and the field of view of an observer wearing the near-eye display device of FIG. 1. Please refer to FIG. 6. The center field of gaze area D1 of human eyes is about 20° to 30° in the horizontal direction. The near-peripheral vision area D2 is within the range between 50° and 60° in the horizontal direction, any range exceeding beyond the above range is considered the peripheral vision area D3. It can be derived from the technology in this field that human eyes are able to perform text recognition in the center field of gaze area D1, able to perform shape recognition in the near-peripheral vision area D2, and merely able to perform color recognition in the peripheral vision area D3.

FIG. 6 is a diagram illustrating the relationship between the binocular vision area and the field of view of the observer 10 wearing the near-eye display device 20 based on FIG. 5. Clearly, within the horizontal range of the center field of gaze area D1 and the near-peripheral vision area D2, wearing the near-eye display device 20 will not block the vision of the observer 10. In the peripheral vision area D3 where the near-eye display device 20 partially blocks the vision, since only color recognition and object perception can be performed, the observer's field of view will not be significantly blocked. It should be noted that the vision blocking areas D4 and D5 respectively refer to the areas that block the left eye's field of view E1 and the right eye's field of view E2, and they do not completely block the vision of both eyes. The observer 10 may still have monocular peripheral vision in the vision blocking areas D4 and D5 and is able to sense object, so there will be no safety concerns for the wearer.

Figure 7:
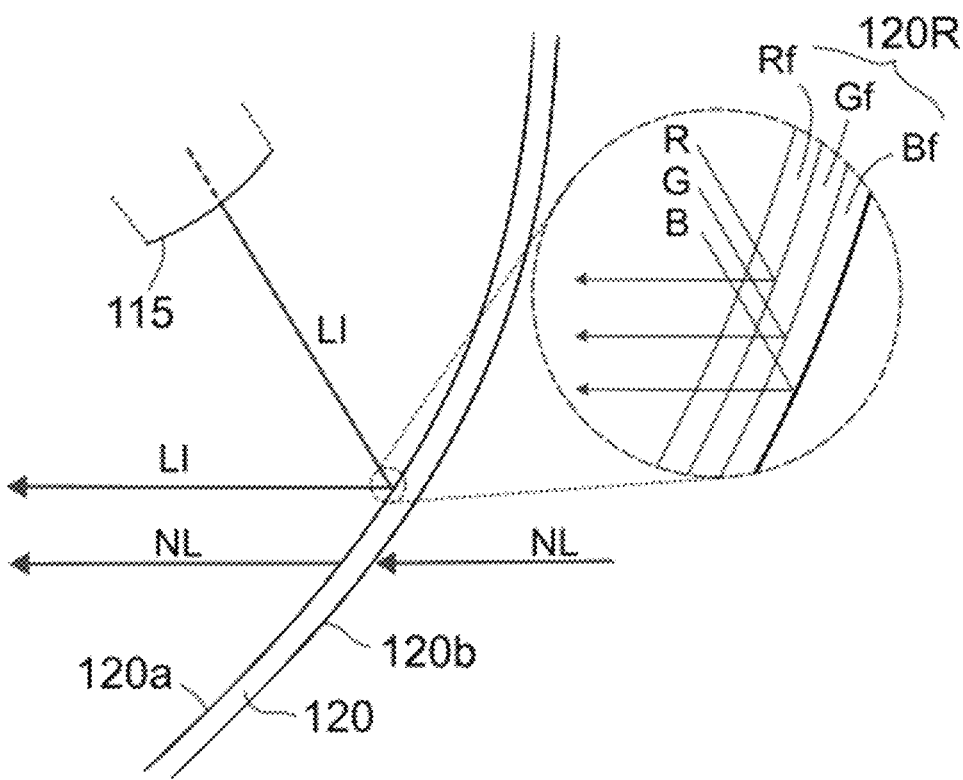
FIG. 7 is a schematic view of improving the optical efficiency of the near-eye display device of FIG. 1.
Figure 8:
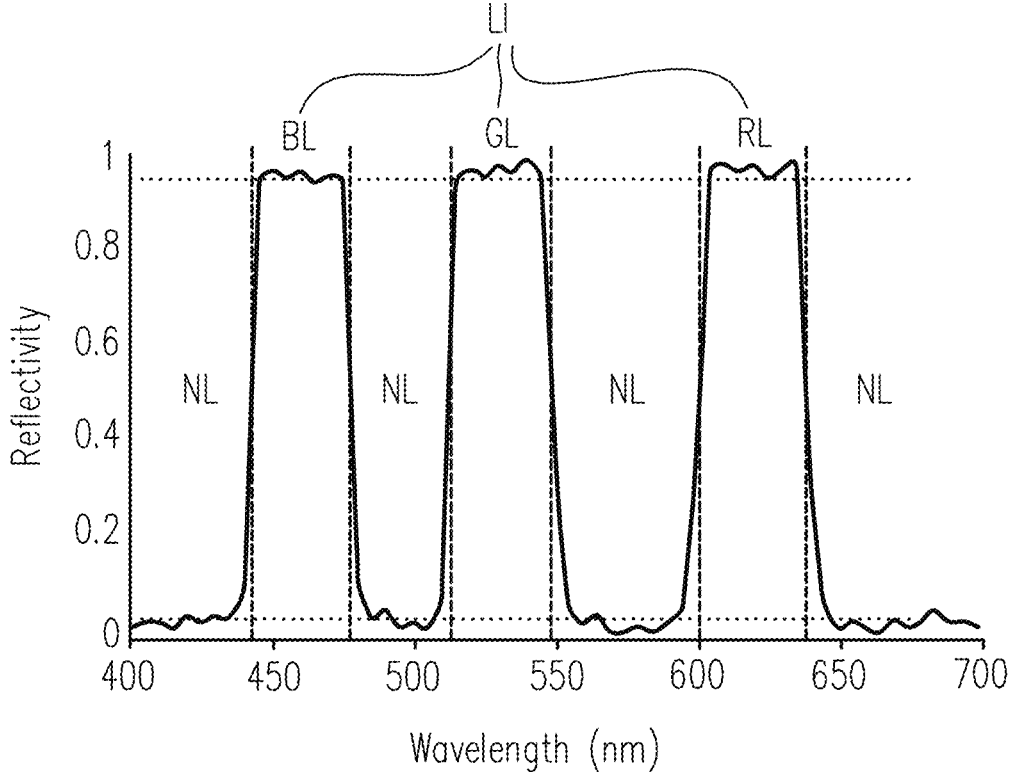
FIG. 8 is a wavelength reflection characteristic diagram of a partial reflective optical element film.

FIG. 7 is a schematic diagram of improving the optical efficiency of the near-eye display device of FIG. 1. Please refer to FIG. 7. The partially reflective partially penetrating film 120R may be composed of three different notch filters stacked together, which are a red light notch filter Rf, a green light notch filter Gf, and a blue light notch filter Bf respectively. Notch filters may be made by adjusting the material and thickness of the dielectric multi-layer film so that the notch filters have the characteristics of high reflection in a specific wavelength region while maintaining high penetration in other wavelength regions. Therefore, in this embodiment, partially reflective partially penetrating film 120R may be designed according to the luminescence spectrum of the image generating device 100, so that the high reflection bands of the red light, green light and blue light notch filters correspond to the display wavelength regions of the red light R, the green light G and the blue light B of the image generating device 100 respectively (as shown in FIG. 8). Therefore, in the RGB display wavelength region LI approximate to the wavelength range of the image light of image generating device 100, the reflectivity of the partially reflective partially penetrating film 120R may be made close to 100%, allowing the image light to be reflected with almost no loss. On the other hand, in other visible light region NL approximate to the range other than the wavelength of image light, the reflectivity of the partially reflective partially penetrating film 120R is approximately close to 0% to prevent external ambient light from being blocked by the partially reflective partially penetrating film 120R.

It should be noted that the film thickness of the notch filter mentioned here needs to be adjusted according to the incident angle of the image light, so that the image light reflected from the inner surface 120a of the partial reflective optical element at different angles have similar reflectivity at a position overlapping and incident onto the position of the exit pupil 130. Such correction may make the virtual image that is seen to have a more correct color, and the color deviation between the periphery and the center is reduced.

FIG. 8 is a wavelength reflection characteristic diagram of the partial reflective optical element film designed based on the above principles. Please refer to FIG. 8. In FIG. 8, the horizontal axis represents wavelength (nm), and the vertical axis represents reflectivity. The wavelength distribution of the image light emitted by the image generating device 100 have the light-emitting characteristics of a micro-light-emitting diode. Specifically, in this embodiment, the red light display wavelength region RL of the image generating device 100 has a wavelength range of 600 nm~630 nm, the green light display wavelength region GL has a wavelength range of 515 nm~545 nm, and the blue light display wavelength region BL has a wavelength range of 440 nm~470 nm. The display wavelength region is defined based on half the peak value of the image light intensity, but the disclosure is not limited thereto, and the reference value may be adjusted depending on the usage. As can be seen from FIG. 8, the partially reflective partially penetrating film 120R has a reflectivity greater than 95% in the red light display wavelength region RL, the green light display wavelength region GL, and the blue light display wavelength region BL of the image generating device 100, and has a reflectivity less than 5% in other visible light regions NL in the display wavelength region.

In the near-eye display device 20 of this embodiment, since the inner surface 120a of the partial reflective optical element 120 is provided with the partial reflective optical element film 120R with a wavelength distribution, characterized in that the reflectivity in the display wavelength region LI corresponding to the image light is higher than the reflectivity in other visible light regions NL, the observer 10 may more easily observe the image light through the reflection of the partially reflective partially penetrating film 120R. In the meantime, the partially reflective partially penetrating film 120R may also suppress the image light emitted to the outside, making it difficult to see the displayed image from the outside, thereby improving the effect of preventing information leakage.

In addition, in the present embodiment, the partially reflective partially penetrating film 120R substantially transmits light in other visible light regions NL, and therefore the transmittance of the external ambient light in the partially reflective partially penetrating film 120R may be increased as much as possible in the wavelength region that does not affect the image light.

Figure 9:
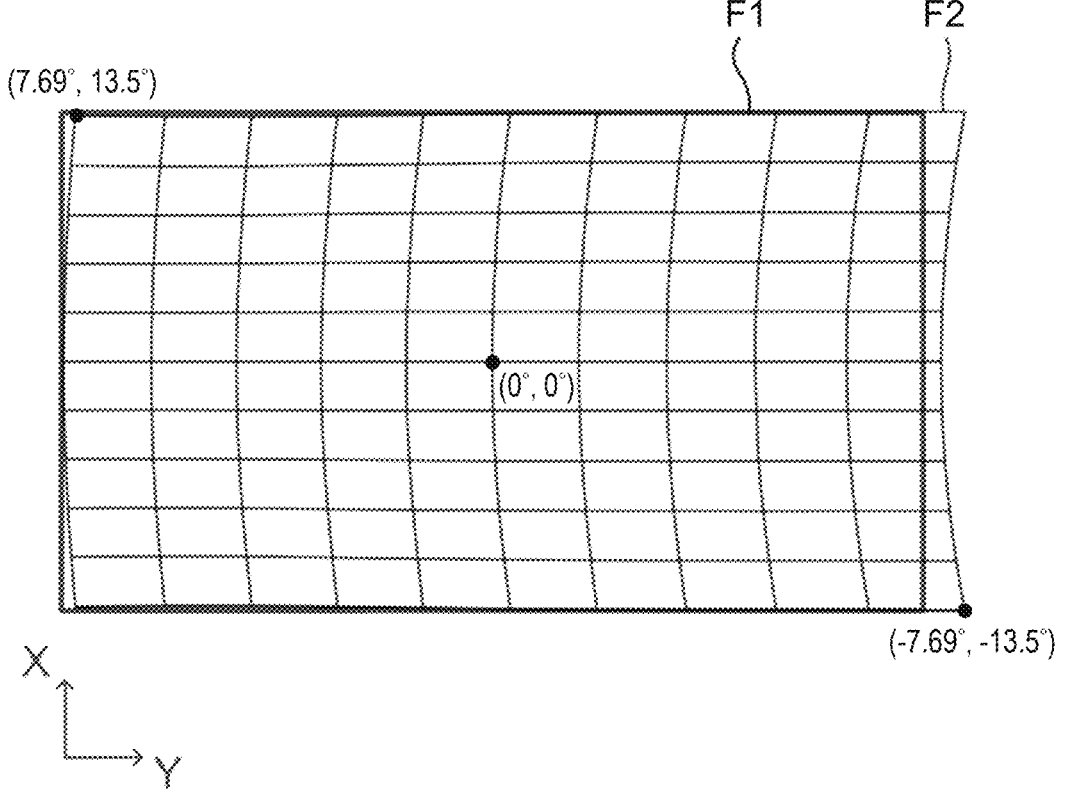
FIG. 9 is a schematic view of distortion correction in a display element.

FIG. 9 is a schematic diagram of distortion correction in a display element. FIG. 9 is a projection image of the near-eye display device 20 on the display plane 100*a* obtained from reverse ray tracing of the exit pupil. As shown in FIG. 9, the area F1 represents the ideal display imaging area. F2 represents the actual reverse tracing projection imaging area. Since the near-eye display device 20 is an off-axis optical system, there is a certain extent of trapezoidal distortion and optical distortion. Although the trapezoidal distortion of the near-eye display device 20 in the Y direction may be well corrected by adjusting the surface curvature of the first reflective surface 112 and the second reflective surface 113 of the optical prism element 110, there are still optical distortions in the X direction that are difficult to be eliminated. In order to enable the observer 10 to observe an image without optical distortion through the near-eye display device 20, a specific method is that each pixel of the image in the ideal display imaging area F1 may be mapped to the corresponding position of the actual reverse tracing projection imaging area F2, and the actual reverse tracing projection imaging area F2 is generated on the display plane 100*a* of the image generating device 100 for correction. The control unit of the mapping transformation function used here may be implemented through digital circuits such as Field Programmable Gate Array (FPGA), Application Specific Integrated Circuit (ASIC), or a Central Processing Unit (CPU) and other processors.

In summary, through the optical structure of this embodiment, the near-eye display device 20 is miniaturized and lightweight. The volume of the optical prism element 110 is about 2 c.c. and the weight thereof is about 2 grams. Near-eye display device 20 is configured in the manner of not blocking the vision of the wearer, and the appearance looks like ordinary glasses. Clearly, this embodiment has an extremely low f-number, which means that the system has higher luminous flux, that is, more image light pass through the exit pupil 130. Additionally, since there are optical films with wavelength distribution on the partial reflective optical element 120, the optical efficiency and environmental transparency of the near-eye display device 20 are effectively improved.

Figure 10:
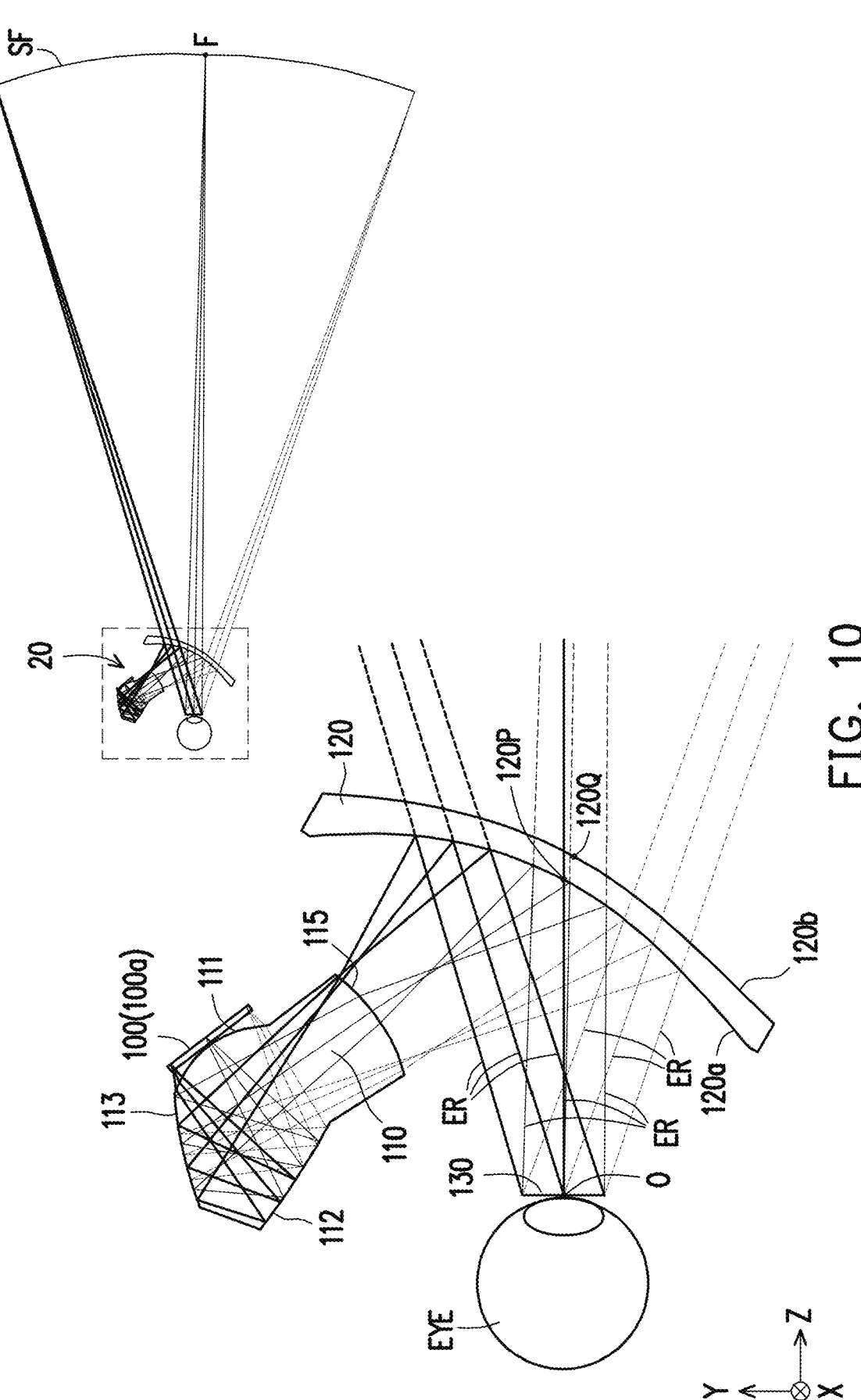
FIG. 10 is a schematic view of an equivalent optical path expansion of a near-eye display device according to another embodiment of the present disclosure.

FIG. 10 is a schematic diagram of an equivalent optical path expansion of a near-eye display device according to another embodiment of the present disclosure. Please refer to FIG. 10. In this embodiment, the implementation of the near-eye display device 20 is substantially the same as that of the embodiment of FIG. 3, with additional consideration of other factors such as ophthalmic prescription lens. Therefore, this embodiment only describes the differences and omits the description of the same optical structure.

Here the optical system needs to be set to two configurations for simulation. The first configuration takes into account the vision status of the human eye and optimizes the optical path that forms a virtual image through the image light of the near-eye display device 20, that is, adjusting the optical power required for ophthalmic correction corresponding to the reflected image light for viewing of the eyes. The second configuration is to correct the see-through part of the eye EYE for viewing the environment by adjusting the optical power required for ophthalmic correction for the eye relative to transmitted light from the external environment.

In this embodiment, the eye EYE is, for example, a myopic state that requires prescription lens correction of optical power of −3.0D (i.e., nearsighted with 3.0 diopter). The visual acuity of a naked eye is equivalent to forming a virtual far point F at a distance of 333.33 mm from the front of the pupil (equivalent to the position of the exit pupil 130), and position thereof represents the extreme distance at which an object can be clearly seen. When the eye EYE rotates, the distance of the far point F will not change, so the far point spherical surface SF will be formed with this distance as the radius. In this embodiment, the FOV of the near-eye display device 20 is 40°. The position of the virtual image of the near-eye display device 20 is formed on the spherical surface SF of the far point, the virtual image display area is a rectangle, and the FOV of 40° is the angle in the diagonal direction. The exit pupil 130 measures an 8 mm×6 mm rectangular area.

The optical path of the near-eye display device 20 in FIG. 10 is the result of optical simulation using a reverse ray tracing method. Reverse ray tracing assumes that the image light ER is equivalent to the beams that passes through the exit pupil 130 and converges at each field of view point of the spherical surface SF of the virtual far point. After being reflected at the inner surface 120*a* of the partial reflective optical element 120, the beams enters the optical prism element 110 and finally are emitted and converges to form an image on the display plane 100*a* of the image generating device 100. The origin of the reference coordinates here is set at the center point O of the exit pupil 130. The surface parameters of the near-eye display device 20 are as described in Tables 5 to 8.

TABLE 5

| f(focal length) = −14.98 mm, Fno(f-number) = 1.24, FOV = 40° | | | | |
|---|---|---|---|---|
| Surface | Type | Radius of curvature | Material | Action |
| SF | Spherical | −333.333 | — | — |
| 130 | Spherical | Infinite | — | — |
| 120a | XY polynomial surface | −43.574 | — | Reflection |
| 115 | XY polynomial surface | −14.583 | Optical resin | Refraction |
| (114) | Spherical | (Infinite) | (Optical resin) | (Reflection) |
| 113 | XY polynomial surface | −4126.020 | Optical resin | Reflection |
| 112 | XY polynomial surface | −39.943 | Optical resin | Reflection |
| 111 | Aspherical | 8.555 | — | Refraction |
| Spherical | Spherical | Infinite | Glass | Refraction |
| 100a | Spherical | Infinite | — | — |

TABLE 6

| Surface | Global coordinates | | | Local axis Rotation angle (°) | |
|---|---|---|---|---|---|
| reference point | X | Y | Z | α (x-axis) | β (y-axis) |
| FS | 0 | 0 | 333.333 | 0 | 0 |
| O | 0 | 0 | 0 | 0 | 0 |
| 120P | 0 | 0 | 31.008 | 28.901 | 0 |
| 115P | 0 | 19.105 | 18.249 | −1.539 | 0 |
| (114P) | (0) | (24.314) | (14.531) | (0) | (40) |
| 113P | 0 | 37.786 | 4.915 | 11.828 | 0 |

TABLE 6-continued

| Surface | Global coordinates | | | Local axis Rotation angle (°) | |
|---|---|---|---|---|---|
| reference point | X | Y | Z | α (x-axis) | β (y-axis) |
| 112P | 0 | 25.854 | 2.435 | 27.039 | 0 |
| 111P | 0 | 35.080 | 14.655 | 10.488 | 0 |
| Cover glass | 0 | 35.203 | 14.817 | 0 | 0 |
| C | 0 | 36.519 | 16.591 | 0 | 0 |

TABLE 7

| | | Aspheric coefficient | | | |
|---|---|---|---|---|---|
| Surface | k | A | B | C | D |
| 111 | −0.949 | 1.082e−04 | −1.041e−06 | 2.986e−09 | 1.086e−10 |

TABLE 8

| Coefficient | Annotation | Surface 120a | 115 | 113 | 112 |
|---|---|---|---|---|---|
| CR | Normalized Radius | 1.000 | 1.000 | 1.000 | 1.000 |
| C1 | $k$ | −1.011 | −0.953 | −1.000 | −1.001 |
| C3 | $y$ | −1.343e−02 | −8.838e−02 | −2.045e−01 | −3.043e−01 |
| C4 | $x^2$ | 3.274e−04 | 4.199e−03 | −5.704e−03 | 9.857e−03 |
| C6 | $y^2$ | −1.668e−03 | 1.140e−02 | −1.286e−02 | −6.154e−03 |
| C8 | $x^2y$ | −1.790e−04 | −1.377e−03 | 2.503e−04 | 3.382e−04 |
| C10 | $y^3$ | −7.242e−05 | 3.170e−04 | 5.481e−06 | 1.132e−04 |
| C11 | $x^4$ | 8.021e−07 | −1.565e−04 | 2.946e−05 | −2.654e−05 |
| C13 | $x^2y^2$ | 1.813e−06 | −1.728e−04 | 4.655e−05 | 3.624e−05 |
| C15 | $y^4$ | 1.925e−06 | −5.491e−05 | 9.771e−06 | 3.414e−05 |
| C17 | $x^4y$ | 8.698e−08 | 3.428e−05 | −7.608e−06 | 3.169e−06 |
| C19 | $x^2y^3$ | 1.657e−07 | 1.802e−05 | −2.043e−06 | −3.927e−06 |
| C21 | $y^5$ | 0 | 0 | −7.080e−07 | −1.954e−06 |
| C22 | $x^6$ | 0 | 0 | 2.508e−06 | 1.727e−05 |
| C24 | $x^4y^2$ | 2.295e−09 | 8.084e−07 | −6.277e−07 | 5.543e−07 |
| C26 | $x^2y^4$ | 4.690e−09 | 1.529e−06 | 1.926e−07 | −1.823e−07 |
| C28 | $y^6$ | 0 | 0 | −9.017e−08 | −2.233e−07 |
| C30 | $x^6y$ | 0 | 0 | 1.199e−06 | −1.908e−06 |
| C32 | $x^4y^3$ | −5.103e−11 | −9.353e−07 | 6.436e−07 | 5.510e−08 |
| C34 | $x^2y^5$ | 0 | 0 | 4.438e−08 | 2.094e−07 |
| C36 | $y^7$ | 0 | 0 | 2.525e−08 | 1.084e−07 |
| C37 | $x^8$ | 0 | 0 | −3.921e−07 | −3.026e−06 |
| C39 | $x^6y^2$ | 0 | 0 | −6.995e−08 | −4.222e−08 |
| C41 | $x^4y^4$ | 4.977e−11 | −7.643e−08 | 3.479e−08 | −1.530e−08 |
| C43 | $x^2y^6$ | 0 | 0 | −3.242e−08 | 3.637e−08 |
| C45 | $y^8$ | 0 | 0 | 3.376e−09 | 1.092e−08 |
| C47 | $x^8y$ | 0 | 0 | −5.566e−08 | 2.897e−07 |
| C49 | $x^6y^3$ | 0 | 0 | −4.649e−08 | −4.988e−08 |
| C51 | $x^4y^5$ | 0 | 0 | −1.155e−08 | 3.855e−12 |
| C53 | $x^2y^7$ | 0 | 0 | 1.125e−09 | −9.096e−09 |
| C55 | $y^9$ | 0 | 0 | −3.076e−10 | −1.541e−09 |
| C56 | $x^{10}$ | 0 | 0 | 1.776e−08 | 2.001e−07 |
| C58 | $x^8y^2$ | 0 | 0 | 8.067e−09 | 3.864e−09 |
| C60 | $x^6y^4$ | 0 | 0 | 2.638e−09 | 3.367e−10 |
| C62 | $x^4y^6$ | 0 | 0 | −7.576e−11 | −2.099e−09 |
| C64 | $x^2y^8$ | 0 | 0 | 1.123e−09 | −1.538e−09 |
| C66 | $y^{10}$ | 0 | 0 | −5.647e−11 | −2.148e−10 |

Different from the embodiment of FIG. 3, the direction of the projection optical axis AX5 emitting toward the exit pupil 130 is not parallel to the Z direction, but is inclined downward by 1° relative to the Z direction, which is to avoid aberrations that are difficult to be eliminated due to the increased FOV in the +Y direction. In the meantime, it may be ensured that there will be no vignetting at the critical viewing angle in the +Y direction.

Figure 11:
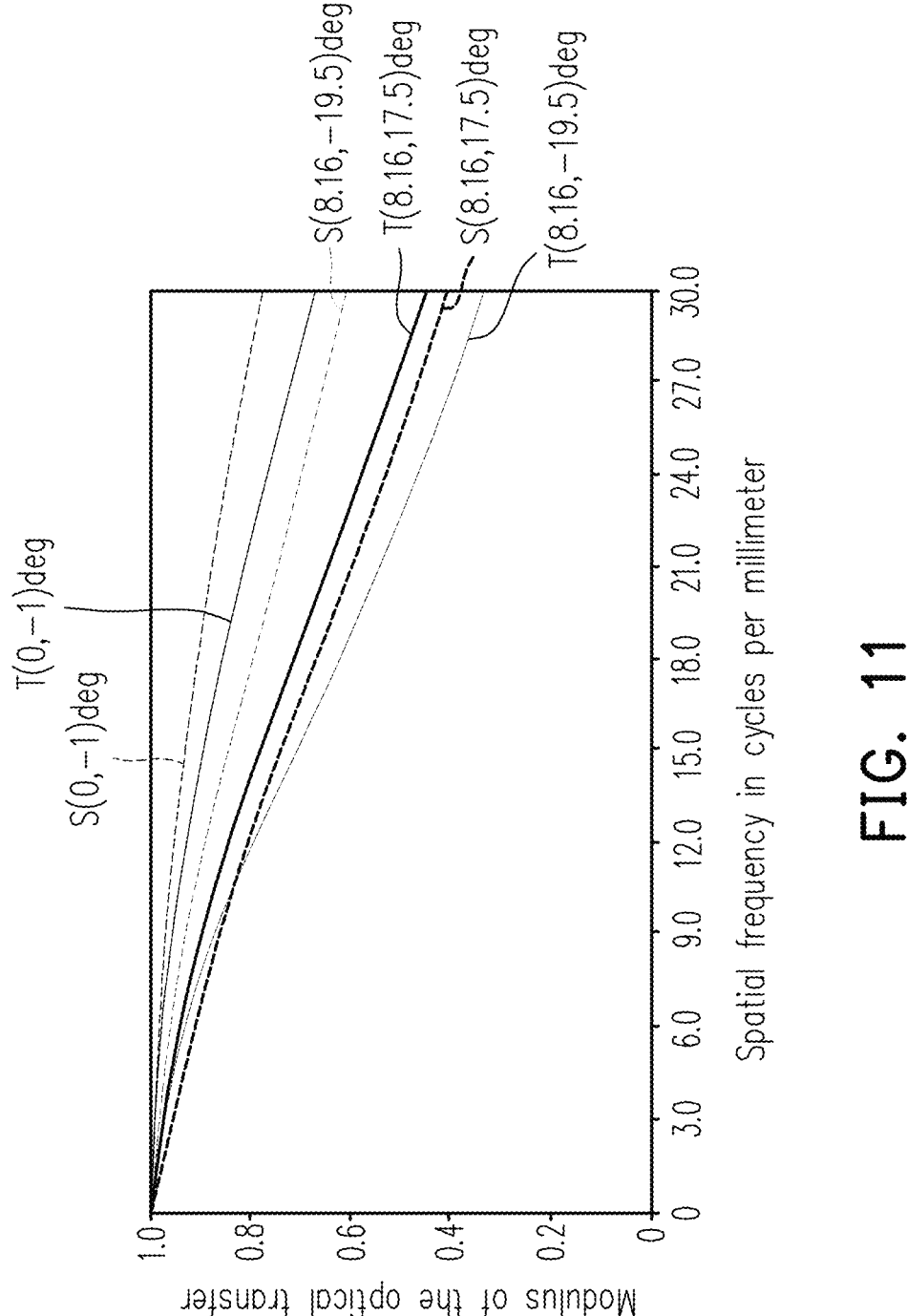
FIG. 11 is a performance diagram of the optical resolving power of the near-eye display device of FIG. 10.

FIG. 11 is a performance diagram of the optical resolving power of the near-eye display device of FIG. 10. Please refer to FIG. 11. FIG. 11 is a modulation transfer function (MTF) diagram of the near-eye display device 20, in which the horizontal axis is the spatial frequency in cycles per millimeter, and the vertical axis is the modulus of the optical transfer function, T represents the curve in the meridional direction, S represents the curve in the sagittal direction, and the values marked next to "T" and "S" represent the FOV. It can be seen from the figure that the quality of the virtual image formed by the image generating device 100 through each optical element is in a good state, and the modulus of the optical transfer function of all FOVs is greater than 0.3 at 30 cycles/mm, which means that the observer may clearly observe the information displayed in the virtual image in naked vision.

Figure 12:
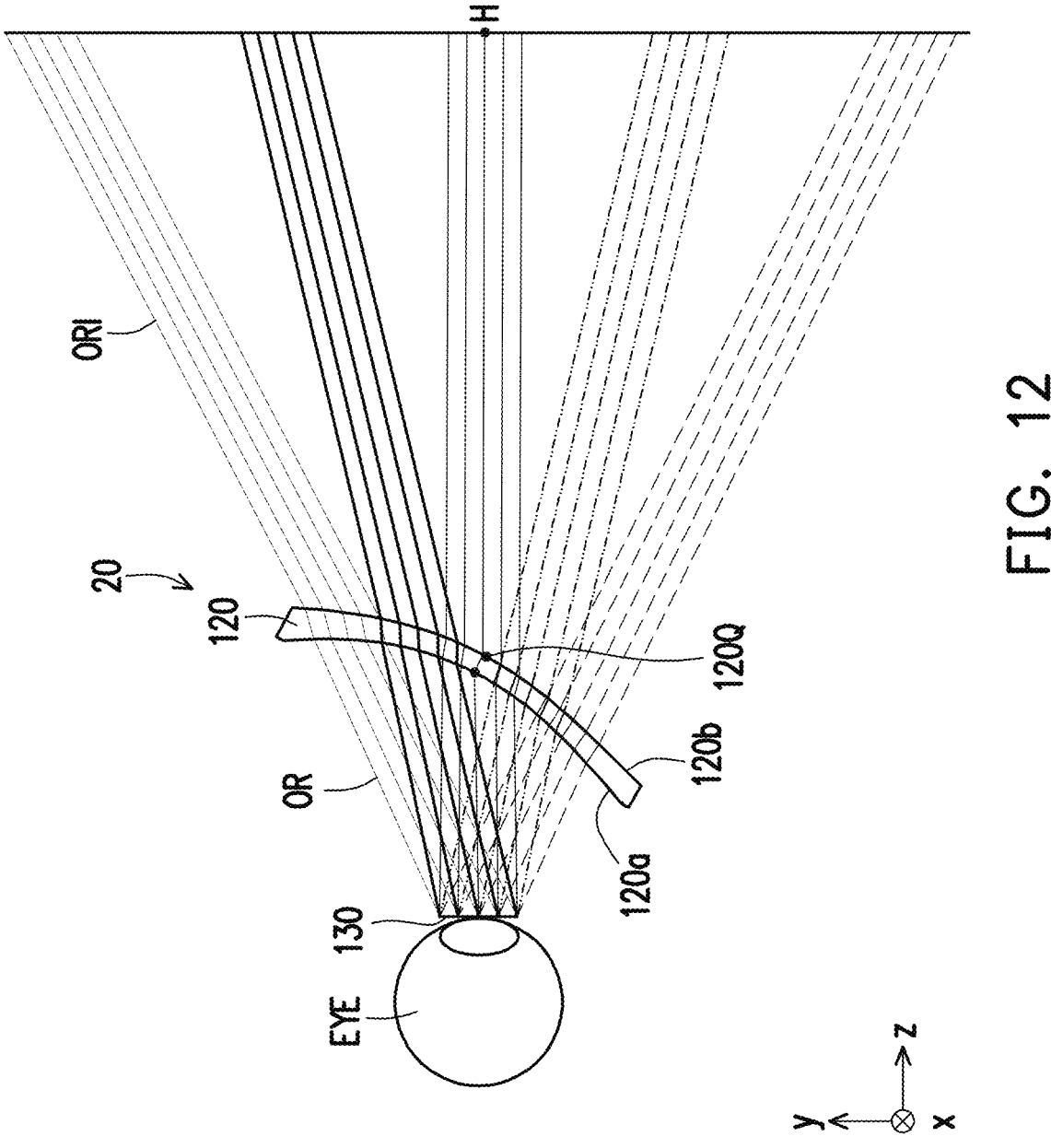
FIG. 12 is a diagram of a see-through optical path of a simulated prescription lens.

FIG. 12 is a diagram of the see-through optical path of a simulated prescription lens. Please refer to FIG. 12. In order to eliminate the myopia state of the eye EYE of the observer, the inner surface 120a and the outer surface 120b of the partial reflective optical element 120 need to be designed as prescription lenses with an optical power of −3.0D. The surface parameters are as shown in Tables 9 to 11. Here, the surface types of the inner surface 120a and the outer surface 120b are free-form surfaces, which have better ability to suppress astigmatism. In order to be more in line with the manufacturing of ophthalmic lenses, polycarbonate (PC), a commonly used material for ophthalmic lenses, is adopted. It is important to note that prescription lenses are designed to allow the wearer to have a wider field of view, so a viewing angle of at least 50° is taken into consideration.

Optimization of optical path is performed in a reverse ray tracing. It is assumed that the ambient light OR of each field of view passing through the exit pupil 130 and converging at the position of the spherical surface SF of the virtual far point penetrate the partial reflective optical element 120. By changing the optical power through adjusting the surface parameters of the inner surface 120a and the outer surface 120b, it is possible to refract the ambient light OR into infinite collimated light ORI, which is equivalent to correcting the wearer's vision to normal vision, so that the wearer may clearly observe the external environment.

TABLE 9

| Surface | Type | Radius of curvature | Material | Action |
|---|---|---|---|---|
| SF | Spherical | −333.333 | — | — |
| 130 | Spherical | Infinite | — | — |
| 120a | XY polynomial surface | −43.574 | — | Refraction |
| 120b | XY polynomial surface | −44.271 | Polycarbonate | Refraction |
| Reference image plane | Spherical | Infinite | — | — |

TABLE 10

| Surface reference point | Global coordinates | | | Local axis Rotation angle (°) | |
|---|---|---|---|---|---|
| | X | Y | Z | α (x-axis) | β (y-axis) |
| FS | 0 | 0 | 333.333 | 0 | 0 |
| O | 0 | 0 | 0 | 0 | 0 |
| 120P | 0 | 0 | 31.008 | 28.901 | 0 |
| 120Q | 0 | −1.208 | 33.197 | 0 | 0 |
| H | 0 | 0 | 80.000 | −28.901 | 0 |

TABLE 11

| Coefficient | Annotation | Surface | |
|---|---|---|---|
| | | 120a | 120b |
| CR | Normalized Radius | 1.000 | 1.000 |
| C1 | $k$ | −1.011 | −2.512 |
| C3 | $y$ | −1.343e−02 | 3.148e−03 |
| C4 | $x^2$ | 3.274e−04 | 2.894e−03 |
| C6 | $y^2$ | −1.668e−03 | 5.466e−04 |
| C8 | $x^2y$ | −1.790e−04 | −1.628e−04 |
| C10 | $y^3$ | −7.242e−05 | −5.957e−05 |
| C11 | $x^4$ | 8.021e−07 | −4.451e−07 |
| C13 | $x^2y^2$ | 1.813e−06 | −4.880e−07 |
| C15 | $y^4$ | 1.925e−06 | 6.729e−07 |
| C17 | $x^4y$ | 8.698e−08 | 8.192e−08 |
| C19 | $x^2y^3$ | 1.657e−07 | 1.081e−07 |
| C24 | $x^4y^2$ | 2.295e−09 | 2.016e−09 |
| C26 | $x^2y^4$ | 4.690e−09 | 4.290e−09 |
| C32 | $x^4y^3$ | −5.103e−11 | −1.216e−10 |
| C41 | $x^4y^4$ | 4.977e−11 | 1.930e−11 |

Figure 13:
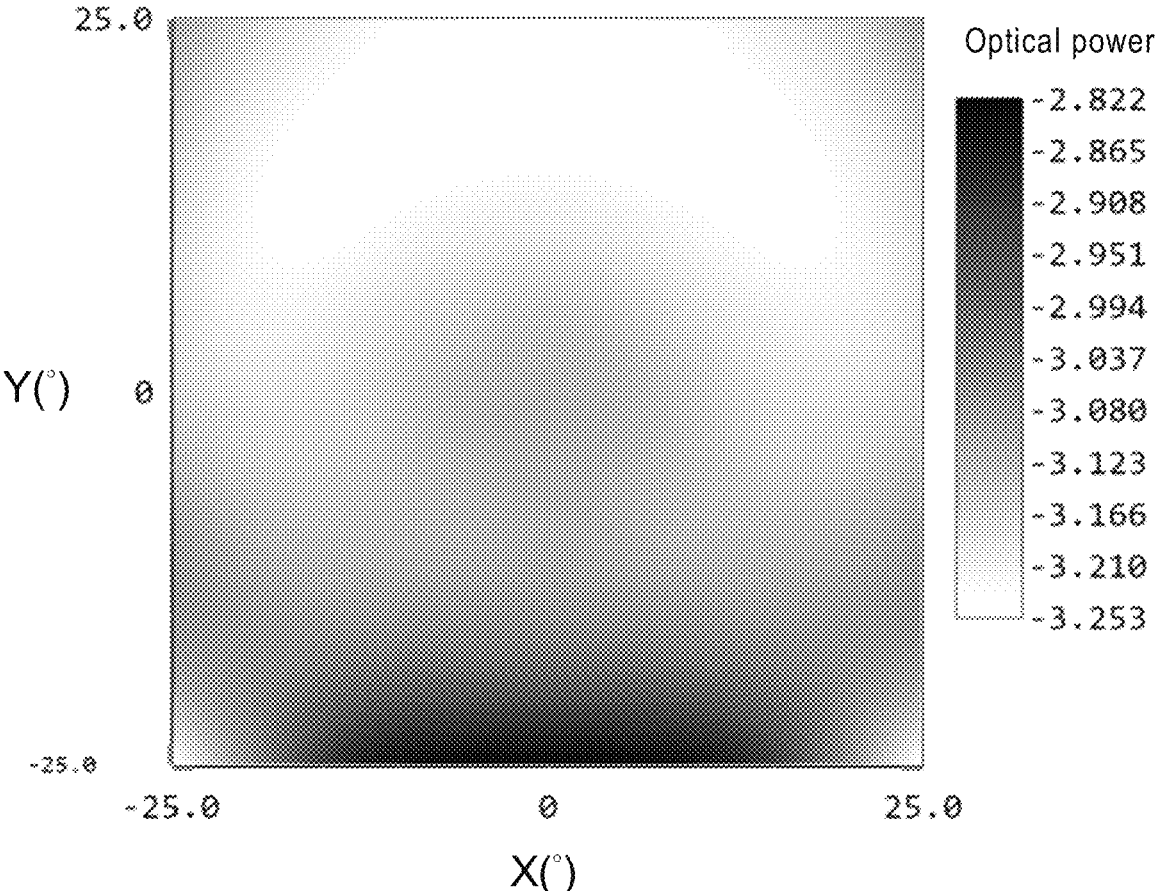
FIG. 13 is an optical power distribution diagram of a prescription lens.

FIG. 13 is an optical power distribution diagram of prescription lens. Please refer to FIG. 13. Within a 50-degree viewing angle in the X and Y directions, the difference between the optical power and the target value of −3.0 is controlled within plus or minus 0.25D, indicating that both central and peripheral vision are well corrected.

The above embodiment realizes the characteristics of lower f-number and wide FOV, and also greatly simplifies the configuration required for people with myopia to wear the near-eye display device 20. According to the diopter in myopia of the wearer, a near-eye display device 20 with an optical power suitable for the wearer is designed. The wearer does not need to wear additional prescription lens, and may clearly observe the virtual image and the external environment through the near-eye display device 20, which not only reduces the weight, but also increases the aesthetics and practicality of the device.

To sum up, the first embodiment shows that the near-eye display device is a device with a relay optical element. The eccentric prism is utilized to fold the optical path, thereby further realizing miniaturization of the relay optical element and make the arrangement of the device to be similar to ordinary glasses. Additionally, through the optical film with a prescribed wavelength distribution, the optical efficiency and environmental transparency of the device are improved. Another embodiment improves the magnification of the partial reflective optical element in the above structure, thus achieving the goals of wide FOV and lower f-number. Moreover, the wearer's vision condition is taken into consideration, and the function of ophthalmic prescription correction is added. The wearer may clearly observe the virtual image and the external environment directly through the near-eye display device.

Although the present disclosure has been disclosed above through embodiments, it is not intended to limit the present disclosure. Anyone with ordinary knowledge in the technical field may make some modifications and refinement without departing from the spirit and scope of the present disclosure, so the scope to be protected by the present disclosure shall be determined by the appended claims.

What is claimed is:

1. A near-eye display device, comprising:

an image generating device disposed to provide an image light;

an optical prism element disposed on a transmission path of the image light from the image generating device, wherein the optical prism element is a relay optical element disposed to guide the image light, the optical prism element comprises a first refractive surface, a first reflective surface, a second reflective surface, a plane mirror and a second refractive surface that guide the image light in sequence, each of the surfaces is eccentrically positioned relative to the others and form an interior filled with a medium having a refractive index greater than 1; and a partial reflective optical element disposed on a transmission path of the image light from the optical prism element, wherein the partial reflective optical element is an optical combiner disposed to guide the image light and an external ambient light toward an exit pupil, wherein the image generating device comprises a display element having a display plane, and a chief ray of the image light satisfies the following conditions: (1) the chief ray passes through the first refractive surface along a projection optical axis, and the projection optical axis is perpendicular to the display plane; (2) the chief ray is in a converging state after passing through the first refractive surface; and (3) the chief ray is in a crossed state relative to the projection optical axis either between the first reflective surface and the second reflective surface, or between the second reflective surface and the second refractive surface, wherein the near-eye display device satisfies a condition as follows: 3.2<(L1+L2)/R<4.3, where L1 is a distance from a surface reference point of the first refractive surface to a surface reference point of the first reflective surface, L2 is a distance from the surface reference point of the first reflective surface to a surface reference point of the second reflective surface, and R is a radius of curvature of the first refractive surface.

2. The near-eye display device according to claim 1, wherein the image generating device comprises a display control circuit, the display control circuit is disposed to control a circuit to drive the display element.

3. The near-eye display device according to claim 1, wherein at least two of the first refractive surface, the first reflective surface, the second reflective surface and the second refractive surface are free-form surfaces.

4. The near-eye display device according to claim 3, wherein each of the free-form surfaces is a non-rotationally symmetric surface and has a plane symmetry line, on one of the non-rotationally symmetric surface, opposite sides of the plane symmetry line are symmetrical to each other along the plane symmetry line.

5. The near-eye display device according to claim 1, wherein the first reflective surface and the second reflective surface are concave reflective surfaces.

6. The near-eye display device according to claim 1, wherein the image light reflected by the first reflective surface and transmitted to the second reflective surface is divergent light beams or substantially parallel light beams.

7. The near-eye display device according to claim 1, wherein the image light reflected by the second reflective surface and transmitted to the second refractive surface is convergent light beams.

8. The near-eye display device according to claim 1, wherein the near-eye display device has an intermediate image located between the partial reflective optical element and the optical prism element.

9. The near-eye display device according to claim 1, wherein the first reflective surface, the second reflective surface and the plane mirror are high reflectivity surfaces with a reflectivity greater than or equal to 97%.

10. The near-eye display device according to claim 1, wherein there are anti-reflective films on surfaces of the first refractive surface and the second refractive surface.

11. The near-eye display device according to claim 1, wherein the image light incident on the first reflective surface along a projection optical axis and the image light emitted on the second reflective surface along the projection optical axis intersect each other to form an included angle, and the angle ranges from 85° to 95°.

12. The near-eye display device according to claim 1, wherein the image light that is incident on the plane mirror along a projection optical axis and the image light that exits the plane mirror along the projection optical axis intersect each other to form an included angle, and the angle ranges from 70° to 80°.

13. The near-eye display device according to claim 1, wherein the partial reflective optical element has an inner surface, an outer surface and an intermediate medium, the inner surface and the outer surface are freeform surfaces, the intermediate medium is a transparent material with a refractive index greater than 1.

14. The near-eye display device according to claim 13, wherein the inner surface and the outer surface are non-rotationally symmetric surfaces and have a plane symmetry line, on a same surface, opposite sides of the plane symmetry line are symmetrical to each other along the plane symmetry line.

15. The near-eye display device according to claim 13, wherein the inner surface has an inner surface curvature which is adjusted into an optical power required for ophthalmic prescription correction for eyes to observe a reflected and enlarged virtual image corresponding to the image light from the optical prism element, and the outer surface has an outer surface curvature which is adjusted into an optical power required for the ophthalmic prescription correction for eyes to observe a transmitted light from an external ambient light corresponding to a refractive index of the intermediate medium and the inner surface curvature.

16. The near-eye display device according to claim 13, wherein the inner surface and the outer surface are configured with an optical film, which has anti-fouling properties, anti-fogging properties, anti-scratch properties, and optical properties with a high reflectivity for at least one specific wavelength region and a high penetration for the at least one specific wavelength region.

17. The near-eye display device according to claim 16, wherein a reflectivity of the optical films on the inner surface in the at least one specific wavelength region that corresponds to a wavelength of the image light is greater than 95%, while a reflectivity of other wavelength regions that do not correspond to the wavelength of the image light is less than 5%, a transmittance of the optical film on the outer surface in the at least one specific wavelength region that corresponds to visible light regions is greater than 95%.

* * * * *